(12) United States Patent
Matsumoto et al.

(10) Patent No.: US 10,640,588 B2
(45) Date of Patent: May 5, 2020

(54) POLYACRYLIC ACID (SALT), POLYACRYLIC ACID (SALT)-BASED WATER-ABSORBING RESIN, AND PROCESS FOR PRODUCING SAME

(71) Applicant: NIPPON SHOKUBAI CO., LTD., Osaka (JP)

(72) Inventors: Satoshi Matsumoto, Hyogo (JP); Yuki Kabeya, Hyogo (JP); Kunihiko Ishizaki, Hyogo (JP); Shigeru Sakamoto, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/440,817

(22) Filed: Feb. 23, 2017

(65) Prior Publication Data

US 2017/0158791 A1    Jun. 8, 2017

Related U.S. Application Data

(62) Division of application No. 13/643,498, filed as application No. PCT/JP2011/060195 on Apr. 26, 2011, now abandoned.

(30) Foreign Application Priority Data

Apr. 26, 2010    (JP) .................................. 2010-101537

(51) Int. Cl.
*C08F 20/06*    (2006.01)
*C08F 120/06*    (2006.01)
(Continued)

(52) U.S. Cl.
CPC ............. *C08F 20/06* (2013.01); *B01J 20/261* (2013.01); *B01J 20/267* (2013.01);
(Continued)

(58) Field of Classification Search
CPC ...... C08F 20/06; C08F 220/06; C08F 120/06; B01J 20/267; B01J 20/261
See application file for complete search history.

(56) References Cited

U.S. PATENT DOCUMENTS 5,149,335 A    9/1992    Kellenberger et al.
6,124,391 A    9/2000    Sun et al.
(Continued)

FOREIGN PATENT DOCUMENTS

CN    1610707    4/2005
CN    1642897    7/2005
(Continued)

OTHER PUBLICATIONS

Japanese Notice of Reasons for Rejection dated Apr. 15, 2014 for JP Appln. No. 2012-512867, and its English translation.
(Continued)

*Primary Examiner* — Ling Siu Choi
*Assistant Examiner* — David L Miller
(74) *Attorney, Agent, or Firm* — Dickinson Wright PLLC

(57) ABSTRACT

Disclosed are a polyacrylate (salt) and a polyacrylate (salt) water-absorbent resin containing a tracer which can be verified back to the manufacturing process of the water-absorbent resin when dealing with various problems with the water-absorbent resin which can occur from the manufacturing process of the water-resistant resin, during the use thereof by a consumer, up until the disposal thereof. The disclosed polyacrylate (salt) and the polyacrylate (salt) water-absorbent resin have a carbon stable isotope ratio ($\delta^{13}C$) of at least −20‰ when measured by accelerator mass spectrometry.

12 Claims, 1 Drawing Sheet

US 10,640,588 B2

Page 2

(51) Int. Cl.
*C08F 220/06* (2006.01)
*B01J 20/26* (2006.01)
*B01J 20/30* (2006.01)

(52) U.S. Cl.
CPC ......... *B01J 20/3085* (2013.01); *C08F 120/06* (2013.01); *C08F 220/06* (2013.01)

(56) References Cited

U.S. PATENT DOCUMENTS

| | | | |
|---|---|---|---|
| 6,164,455 A | 12/2000 | Kakita et al. | |
| 6,291,635 B1 | 9/2001 | Maeda et al. | |
| 6,388,000 B1 | 5/2002 | Irie et al. | |
| 6,444,744 B1 | 9/2002 | Fujimaru et al. | |
| 6,641,064 B1 | 11/2003 | Dentler et al. | |
| 6,716,894 B2 | 4/2004 | Kajikawa et al. | |
| 6,727,345 B2 | 4/2004 | Kajikawa et al. | |
| 6,817,557 B2 | 11/2004 | Kakita et al. | |
| 6,927,268 B2 | 8/2005 | Matsumoto et al. | |
| 6,998,447 B2 | 2/2006 | Irie et al. | |
| 7,049,000 B2 | 5/2006 | Fossum et al. | |
| 7,186,541 B2 | 3/2007 | Gokarn et al. | |
| 7,186,856 B2 | 3/2007 | Meng et al. | |
| 7,238,743 B2 | 7/2007 | Matsumoto et al. | |
| 7,393,676 B2 | 7/2008 | Gokarn et al. | |
| 7,612,230 B2 | 11/2009 | Shima et al. | |
| 7,638,316 B2 | 12/2009 | Gokarn et al. | |
| 7,682,702 B2 | 3/2010 | Nitschke | |
| 7,754,916 B2 | 7/2010 | Bogan et al. | |
| 7,960,485 B2 | 6/2011 | Funk et al. | |
| 8,076,120 B2 | 12/2011 | Gokarn et al. | |
| 8,138,292 B2 | 3/2012 | Matsumoto et al. | |
| 8,148,485 B2 | 4/2012 | Nogi et al. | |
| 8,178,719 B2 | 5/2012 | Shima et al. | |
| 8,198,066 B2 | 6/2012 | Gokarn et al. | |
| 8,198,481 B2 | 6/2012 | Kuppinger et al. | |
| 8,501,455 B2 | 8/2013 | Gokarn et al. | |
| 9,518,133 B2 * | 12/2016 | Fujino ...................... C08F 2/44 | |
| 2002/0161132 A1 | 10/2002 | Irie et al. | |
| 2004/0076982 A1 | 4/2004 | Gokarn et al. | |
| 2004/0110914 A1 * | 6/2004 | Nakahara ................. A61L 15/60 | 526/317.1 |
| 2004/0210087 A1 | 10/2004 | Meng et al. | |
| 2005/0209411 A1 | 9/2005 | Nestler et al. | |
| 2005/0221457 A1 | 10/2005 | Tsobanakis et al. | |
| 2005/0245393 A1 | 11/2005 | Herfert et al. | |
| 2006/0036043 A1 | 2/2006 | Nestler et al. | |
| 2007/0129570 A1 | 6/2007 | Shima et al. | |
| 2007/0161759 A1 | 7/2007 | Riegel et al. | |
| 2007/0184524 A1 | 8/2007 | Gokarn et al. | |
| 2007/0219521 A1 * | 9/2007 | Hird ...................... A61F 13/15203 | 604/370 |
| 2007/0225422 A1 | 9/2007 | Sakamoto et al. | |
| 2007/0232760 A1 | 10/2007 | Fujimaru et al. | |
| 2008/0076167 A1 | 3/2008 | Gokarn et al. | |
| 2008/0103243 A1 * | 5/2008 | Sunkara ................. C08L 67/025 | 524/414 |
| 2008/0214750 A1 | 9/2008 | Stueven et al. | |
| 2008/0221277 A1 | 9/2008 | Walden et al. | |
| 2008/0280128 A1 | 11/2008 | Furno et al. | |
| 2008/0287631 A1 | 11/2008 | Nitschke | |
| 2009/0023006 A1 | 1/2009 | Bub et al. | |
| 2009/0053783 A1 | 2/2009 | Gokarn et al. | |
| 2009/0076297 A1 | 3/2009 | Bogan et al. | |
| 2009/0105389 A1 | 4/2009 | Walden et al. | |
| 2009/0202805 A1 | 8/2009 | Furno et al. | |
| 2009/0227741 A1 | 9/2009 | Walden et al. | |
| 2009/0239995 A1 | 9/2009 | Bub et al. | |
| 2009/0298144 A1 | 12/2009 | Tsobanakis et al. | |
| 2010/0063233 A1 | 3/2010 | Shima et al. | |
| 2010/0093949 A1 | 4/2010 | Herfert et al. | |
| 2010/0249320 A1 * | 9/2010 | Matsumoto ............. C08F 6/008 | 524/832 |
| 2011/0003926 A1 | 1/2011 | Nogi et al. | |
| 2011/0006140 A1 | 1/2011 | Ishizaki et al. | |

| | | | |
|---|---|---|---|
| 2011/0009590 A1 | 1/2011 | Matsumoto et al. | |
| 2011/0011491 A1 | 1/2011 | Matsumoto et al. | |
| 2011/0015351 A1 | 1/2011 | Nogi et al. | |
| 2011/0021725 A1 | 1/2011 | Takaai et al. | |
| 2011/0028670 A1 * | 2/2011 | Matsumoto ................ C08J 3/12 | 526/317.1 |
| 2011/0034603 A1 * | 2/2011 | Fujino ..................... A61L 15/22 | 524/320 |
| 2011/0039961 A1 | 2/2011 | Matsumoto et al. | |
| 2011/0088806 A1 | 4/2011 | Nogi et al. | |
| 2011/0105791 A1 * | 5/2011 | Kuppinger ............ C07C 51/377 | 562/599 |
| 2011/0110730 A1 | 5/2011 | Nogi et al. | |
| 2011/0139657 A1 | 6/2011 | Hird et al. | |
| 2011/0139658 A1 | 6/2011 | Hird et al. | |
| 2011/0139662 A1 | 6/2011 | Hird et al. | |
| 2011/0152812 A1 | 6/2011 | Hird et al. | |
| 2011/0166300 A1 | 7/2011 | Dairoku et al. | |
| 2011/0306732 A1 * | 12/2011 | Fujino ....................... C08F 2/44 | 525/385 |
| 2012/0077236 A1 | 3/2012 | Gokarn et al. | |
| 2012/0108767 A1 | 5/2012 | Devaux et al. | |
| 2012/0232233 A1 | 9/2012 | Kuppinger et al. | |
| 2012/0244586 A1 | 9/2012 | Gokarn et al. | |
| 2013/0053522 A1 | 2/2013 | Kuppinger et al. | |
| 2013/0150616 A1 | 6/2013 | Tsobanakis et al. | |
| 2013/0253149 A1 | 9/2013 | Kuppinger et al. | |
| 2013/0313149 A1 | 11/2013 | Hird et al. | |
| 2014/0350191 A1 | 11/2014 | Walden et al. | |
| 2016/0206774 A1 | 7/2016 | Hird et al. | |

FOREIGN PATENT DOCUMENTS

| | | | |
|---|---|---|---|
| CN | 101151374 | 3/2008 | |
| DE | 2335951 A1 | 1/1975 | |
| DE | WO 2008023039 A1 * | 2/2008 | .......... C07C 51/377 |
| EP | 0443627 A2 | 8/1991 | |
| EP | 0878488 A2 | 11/1998 | |
| EP | 1949011 | 2/2010 | |
| JP | 2004514431 | 5/2004 | |
| JP | 2004532855 | 10/2004 | |
| JP | 2005521718 | 7/2005 | |
| JP | 2005213225 | 8/2005 | |
| JP | 2007-284675 | 11/2007 | |
| JP | 2009067775 | 4/2009 | |
| JP | WO 2009119754 A1 * | 10/2009 | ............... C08J 3/12 |
| WO | 2006053731 | 5/2006 | |
| WO | 2006092272 A2 | 9/2006 | |
| WO | 2006111402 A2 | 10/2006 | |
| WO | 2007109128 A2 | 9/2007 | |
| WO | WO 2008/023039 A1 | 2/2008 | |
| WO | WO-2009028568 A1 * | 3/2009 | ............. C08F 6/008 |
| WO | 2009113671 | 9/2009 | |
| WO | 2009113672 | 9/2009 | |
| WO | 2009113678 | 9/2009 | |
| WO | 2009113679 | 9/2009 | |
| WO | 2009119754 | 10/2009 | |
| WO | 2009123197 | 10/2009 | |
| WO | WO-2009130915 A1 * | 10/2009 | ............. A61L 15/22 |
| WO | 2010/031949 | 3/2010 | |
| WO | 2010032694 A1 | 3/2010 | |
| WO | WO-2010090324 A1 * | 8/2010 | ................ C08F 2/44 |

OTHER PUBLICATIONS

Japanese Notice of Reasons for Rejection dated Apr. 15, 2014 for JP Appln. No. 2012-512868, and its English translation.
Extended European Search Report dated May 26, 2014 for EP Appln. No. 11775018.2.
Weber, D. et al, 13C-pattern of glycerol: Origin and practical importance, Journal of Agricultural and Food Chemistry, 1997, vol. 45, No. 6, pp. 2042-2046.
Martin, J. et al., Carbon-14 tracer study of polyacrylate polymer in a wastewater plant, Applied Radiation and Isotopes, International Journal of Radiation Applications and Instrumentation, Part A, 1990, vol. 41, No. 10/11, pp. 1165-1172.

(56) References Cited

OTHER PUBLICATIONS

European Office Action dated Feb. 15, 2017 which issued in the counterpart Patent Application No. 11775019.0.
Chinese Office Action, dated Mar. 21, 2014, issued for CN Appln. No. 201180021256.5, and its English translation.
Chinese Office Action, dated Mar. 24, 2014, issued for CN Appln. No. 201180020907.9, and its English translation.
Chinese Office Action, dated Dec. 1, 2014, issued in related CN Application No. 201180020907.9, and English translation thereof.
Chinese Office Action, dated Dec. 5, 2014, issued in related CN Application No. 201180021256.5, and English translation thereof.
Third-Party Submission Under 37 C.F.R. 1.290, dated Aug. 28, 2013, in U.S. Appl. No. 13/643,506.
Office Action, dated Oct. 6, 2014, issued in U.S. Appl. No. 13/643,506.
International Search Report for PCT/JP2011/060195, dated Aug. 23, 2011.
U.S. Appl. No. 13/643,506; Final Office Action dated Jul. 28, 2015, 15 pages, issued by U.S. Patent Office.
Modern Super Absorbent Polymer Technology, 1998, pp. 19-28.
U.S. Non-Final Office Action dated Feb. 10, 2016 that issued in a corresponding U.S. Appl. No. 13/643,506.
Supplemental Partial European Search Report date Feb. 17, 2016 that issued in a corresponding EP Patent Application No. 11775019.0.
European Office Action issued in related counterparty Application No. 11775018.2, dated Oct. 26, 2016.
U.S. Final Office Action issued in related counterpart U.S. Appl. No. 13/643,506, dated Sep. 1, 2016.
Supplementary European Search Report dated Apr. 29, 2016 that issued in a corresponding EP Patent Application No. 11775019.0.
U.S. Office Action dated Jun. 29, 2017 which issued in the corresponding counterpart U.S. Appl. No. 15/441,769.
Communication of Notice of Opposition dated Aug. 1, 2018, which issued in European counterpart Patent Application No. 11775018.2, including English translation.
Markus, Frank, "Superabsorbents"—Ullmann's Encyclopedia of Industrial Chemistry, Published Online: Jan. 15, 2003 (D0), vol. 35, pp. 213-232.
Arriola, Daniel J. et al., "Crosslinker Reactivity and the Structure of Superabsorbent Gels", Crosslinker Reactivity and the Structure of Superabsorbent Gels, 1997 (D15) John Wiley & Sons, Inc., pp. 439-451.

Edana—Absorption Under Pressure 442.2-02, 2002 (D2), Recommended Test Method: Superabsorbent Materials—Polyacrylate Superabsorbent Powders—Gravimetric Determination of Absorption Under Pressure, 7 pages.
Standard Test Methods for Determining the Biobased Content of Solid, Liquid, and Gaseous Samples Using Radiocarbon Analysis, Designation: D6866-10 (D3), Copyright © ASTM International, 15 pages.
Suzuki, Yaeko et al., "An Novel Method to Discriminate Between Plant- and Peroleum-derived Plastics by Stable Carbon Isotope Analysis", Chem. Lett, The Chemical Society of Japan, 2010 (D4), pp. 998-999.
Richter, Eva Katharina et al., "Characterization of Rapeseed (*Brassica napus*) Oils by Bulk, C, O, H, and Fatty Acid C Stable Isotope Analyses", Journal of Agricultural and Food Chemistry, 2010 (D7), Published on Web Jun. 10, 2010, © 2010 American Chemical Society, pp. 8048-8055.
Ohara, Takashi et al., "Acrylic Acid and Derivatives", Ullmann's Encyclopedia of Industrial Chemistry, Published Jan. 15, 2003 (D9), © 2006 Wiley-VCH Verlag GmbH & Co. KGaA, pp. 1-19.
Summons to attend Oral Proceedings pursuant to Rule 115(1) EPC dated Sep. 25, 2018, which issued in the corresponding EP Patent Application No. 11775019.0, 8 pages.
Standard Test Methods for Determining the Biobased Content of Solid, Liquid, and Gaseous Samples Using Radiocarbon Analysis—D6866-18, Copyright by ASTM International, dated Aug. 28, 2018, 19 pages.
U.S. Office Action dated Mar. 19, 2019, which issued in the counterpart U.S. Appl. No. 15/441,769.
Hearing Notice dated Sep. 25, 2019, which issued in the corresponding Indian Patent Application No. 9461/CHENP/2012, including English translation.
Office Action dated May 7, 2018 issued in the corresponding U.S. Appl. No. 15/441,769.
First Examination Report dated Jun. 22, 2018 issued in the related Indian Patent Application No. 9463/CHENP/2012.
First Examination Report dated Jun. 28, 2018 issued in the related Indian Patent Application No. 9461/CHENP/2012.
European Summons to Attend Oral Proceedings Pursuant to Rule 115(1) EPC, which issued in the corresponding European Patent Application No. 11775018.2 (Patent No. 2565211).

* cited by examiner

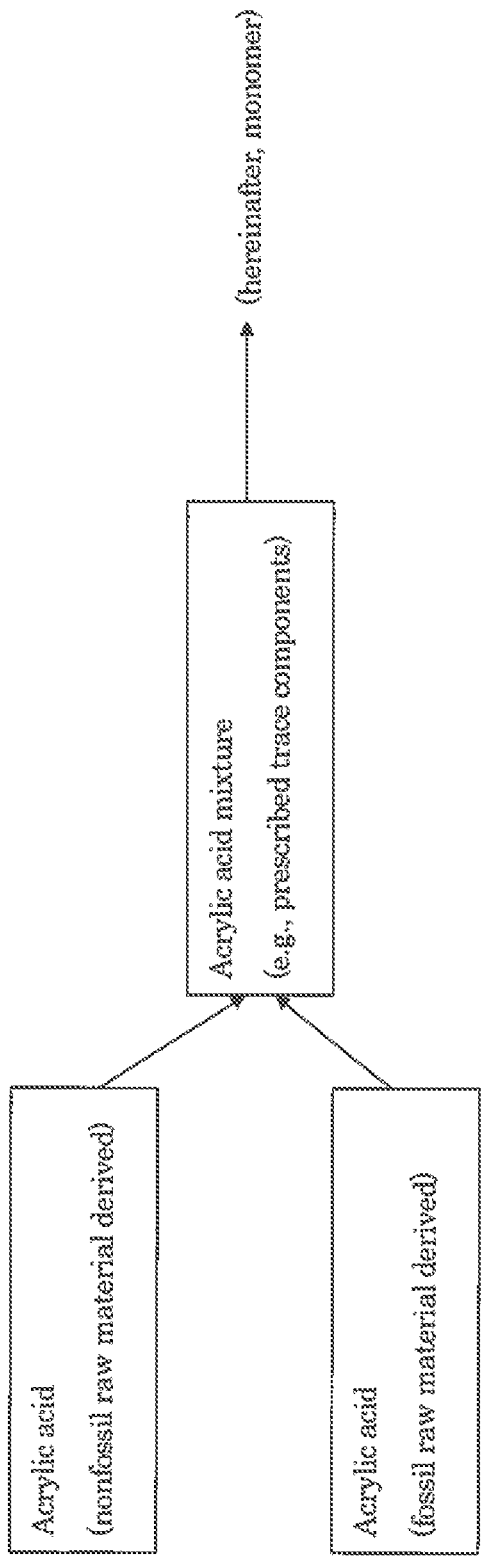

POLYACRYLIC ACID (SALT), POLYACRYLIC ACID (SALT)-BASED WATER-ABSORBING RESIN, AND PROCESS FOR PRODUCING SAME

This application is a divisional application of Ser. No. 13/643,498 flied Oct. 25, 2012, which is hereby incorporated by reference in its entirety.

TECHNICAL FIELD

The present invention relates to a polyacrylic acid (salt), a polyacrylic acid (salt)-type water-absorbing resin and a manufacturing method for same. More specifically, it relates to a polyacrylic acid (salt) and a polyacrylic (salt)-type water-absorbing resin which is easy to identify and trace a polyacrylic acid (salt) and a polyacrylic (salt)-type water-absorbing resin after its production.

BACKGROUND ART

A water-absorbing resin (SAP/Super Absorbent Polymer) is a water-swelling and water-insoluble polymer gelling agent and has been used for mainly disposable uses including absorbing articles (hygiene product) such as paper diapers and sanitary napkins and the like, further, water retention agents for agriculture and horticulture, and water-stopping materials for industrial use and the like (Non-patent Literature Document 1). For these water-absorbing resins, a number of monomers and hydrophilic polymers have been suggested as raw materials. However, a polyacrylic acid salt type water-absorbing resin made mainly from an acrylic acid is mainstream thereof and moat of the water-absorbing resins manufactured all over the world are crosslinked polymer of polyacrylic acid sodium salt. And polyacrylic acid (salt)-type water-absorbing resins are proposed by Patent Documents 1 to 8 and the like. Acrylic acid used for these polymerizations are, in general, obtained by vapor-phase oxidation of propylene from petroleum (fossil material).

Such a water-absorbing resin can be obtained by finely granulating a water-containing gel-like polymer, which is obtained by polymerizing an aqueous monomer solution, during or after the polymerization, and drying the obtained particulated water-containing gel-like polymer. After drying, if necessary, a pulverizing step and a classification step are carried out and arbitrarily, surface-crosslinking is carried out before drying or after drying. Also, one or two or more of steps such as a fine powder recovery step, an undried matter removal step after drying, a packaging step, and an addition step of adding other additives (fine particles, a deodorant, an antibacterial agent, and the like) and the like may also be carried out. A method to be employed as a common polymerization method is aqueous solution polymerization or reverse-phase suspension polymerization and the product form is generally a white powder of about 10 to 1000 μm. Such a process for producing a water-absorbing resin involving the many steps is exemplified in Non-patent Literature Document 1 and Patent Documents 9 to 21 and the like.

And now, most of commercialized water-absorbing resins have a polymer structure of polyacrylic acid sodium salt and are insoluble in a solvent, so that it is impossible to measure their molecular weights as polymers. Also, since having no melting point, glass transition point (Tg), and the like, the water-absorbing resins cannot be distinguished from one another as polyacrylic acid (salts).

Accordingly, in the case where produced water-absorbing resins are actually used for disposable diapers, sanitary napkins, greening humectants, humectants far agriculture and horticulture, digestion gel, and the like after distributed through various distribution channels and subsequently discarded, it is difficult to determine in which factories, which plants, and which production lines such water-absorbing resins and their used hydrogels are produced and even if a certain water-absorbing resin causes a trouble at the time of its use or after its use or even if it is tried to assess the effect on environments, degradability in the ground after landfill or the like, it is difficult to distinguish which water-absorbing resin manufacturer, which factory, which plant, or which production line produced the water-absorbing resin.

The following Patent Documents 18 to 21 disclose such troubles (shutdown) in a pulverizing step, a transporting step, and a storage step. Many methods for producing various kinds of water-absorbing resins as disclosed in the following Patent Documents 1 to 21 have been proposed so far, but they do not disclose a method for solving all the troubles which possibly occur in the process for producing a water-absorbing resin.

Consequently, when a trouble occurs, the production method is revised and in general, the process for producing a water-absorbing resin involves many steps such as a monomer preparation step, a polymerization step, a drying step, a pulverizing step, and a surface-crosslinking step and in some production methods, many different raw materials are used and the production proceeds following a complicated course through many steps, and therefore it is difficult to pursue a cause of a trouble. Also, there are troubles which are discovered after time passes, such as coloration with the lapse of time of a water-absorbing resin as a representative, so that it is difficult to investigate the cause from the production method.

Regarding water-absorbing resins commercialized and distributed after production, there is a method of taking a water-absorbing resin out of a disposable diaper and analyzing the physical properties of the resin as a method for identifying a manufacturer and a distributor. Water-absorbing resins are controlled in accordance with many physical properties as shown in Patent Documents 1 to 21 etc. In recent years, the physical properties required by users represented by disposable diaper manufacturers are more or less similar, and therefore, even if water-absorbing resins are taken out of disposable diapers etc., their physical properties are often similar and consequently, it is difficult to improve the precision of the identification of a manufacturer and a distributer based on the water-absorbing resins. Still more, even if the physical properties (e.g. water absorption rate and water absorption capacity under load) of water-absorbing resins are the same, the measured values are fluctuated by about ±several after the decimal point to one point several after the decimal point [g/g] and even if the physical properties of commercialized products are measured, the identification accuracy is low. It is conceivable to add a tracer substance to a water-absorbing resin; however, addition of a tracer not only causes an adverse effect on the cost and safety but also sometimes deteriorates the performance and whiteness of the water-absorbing resin. Also, such a problem is found occurring not only in the case of a water soluble and water-swelling polyacrylic acid (salt) (also referred to as a polyacrylic acid (salt)-type water-absorbing resin) but also in the case of a water-soluble polyacrylic acid (salt) (also referred to as a water-soluble polymer).

Also, a water-absorbing resin has another problem that the ratio of acrylic acid is high, in other words, the cost of a water-absorbing resin significantly depends on the price of propylene (petroleum). Also, in addition to the above-mentioned problem, since the water-absorbing resin containing acrylic acid as a main component is mainly used for disposal use such as disposable diapers and the like, the water-absorbing resin has another issue of stable supply of a raw material in terms of the cost. To deal with that, there is a technique known for obtaining a water-absorbing resin, for example, a carboxymethyl cellulose crosslinked body and the like by crosslinking starch or cellulose, but the physical properties are inferior as compared with those of a polyacrylic acid (salt).

PRIOR ART DOCUMENTS

Patent Documents

Patent Document 1: U.S. Pat. No. 6,927,268
Patent Document 2: U.S. Pat. No. 7,238,743
Patent Document 3: International Publication No. 2006/053731 pamphlet
Patent Document 4: US Patent Application Publication No. 2006/0036043
Patent Document 5: U.S. Pat. No. 6,388,000
Patent Document 6: U.S. Pat. No. 6,998,447
Patent Document 7: US Patent Application Publication No. 2005/0209411
Patent Document 8: U.S. Pat. No. 6,444,744
Patent Document 9: International Publication No. 2000/113679 pamphlet
Patent Document 10: International Publication No. 2009/113678 pamphlet
Patent Document 11: International Publication No. 2009/113671 pamphlet
Patent Document 12: International Publication No. 2009/113672 pamphlet
Patent Document 13: International Publication No. 2009/119754 pamphlet
Patent Document 14: International Publication No. 2009/123197 pamphlet
Patent Document 15: U.S. Pat. No. 6,716,894
Patent Document 16: U.S. Pat. No. 6,727,345
Patent Document 17: U.S. Pat. No. 6,164,455
Patent Document 18: U.S. Pat. No. 6,617,557
Patent Document 19: U.S. Pat. No. 6,641,064
Patent Document 20: U.S. Pat. No. 6,291,635
Patent Document 21: EP Patent No. 1949011

Non-Patent Literature Documents

Non-patent Literature Document 1: Modern Super Absorbent Polymer Technology (1998), pp. 19-28 etc.

SUMMARY OF THE INVENTION

Problem to be Solved by the Invention

The present invention provides a polyacrylic acid (salt), particularly, a polyacrylic acid (salt)-type water-absorbing resin, with which a production process and development of a polyacrylic acid (salt), particularly, a polyacrylic acid (salt)-type water-absorbing resin, that is, a production factory, a production plant, and a production line of the water-absorbing resin are traceable.

Solutions to the Problems

The present invention has been completed from the view point of the problems above, and an object of the present invention is to provide a water-absorbing resin, which contains a tracer with which the slops used for producing the water-absorbing resin can be examined with respect to various troubles that can arise over the water-absorbing resin during the period from the steps for producing the water absorbing resin to the use and discard thereof by a customer, and a process for producing same, a method for identifying water-absorbing resin and a method for tracing the same.

Inventors of the present invention have made various investigations to solve the above-mentioned problems and as a result, they have focused on that a carbon stable isotope ratio ($\delta^{13}C$) of conventional water-absorbing resins is less than −20‰, and found that it is possible to distinguish a water absorbing resin from conventional water-absorbing resins even if these water-absorbing resins have the same polymer structure and similar physical properties by malting the water-absorbing resin have a carbon stable isotope ratio ($\delta^{13}C$) of −20‰ or higher in the present invention. This finding leads to completion of the present invention.

That is, to solve the above problems, the present invention is to provide a water soluble polyacrylic acid (salt) or water-insoluble and water-swelling polyacrylic acid (salt)-type water absorbing resin having a carbon stable isotope ratio ($\delta^{13}C$) of −20‰ or more when measured by accelerator mass spectrometry method.

To solve the above problems, the present inventive method (a first process invention) for producing a polyacrylic acid (salt) is a method for producing a polyacrylic acid (salt) comprising a polymerization step for a water-soluble unsaturated monomer and a drying step for the obtained water-containing gel-like crosslinked polymer, wherein the polymerization step is for polymerizing acrylic acid with a carbon stable isotope ratio ($\delta^{13}C$) of −20‰ or higher as the water-soluble unsaturated monomer.

Also, to solve the above problems, the present inventive method (a second process invention) for producing a polyacrylic acid (salt)-type water-absorbing resin is a method for producing a polyacrylic acid (salt)-type water-absorbing resin comprising a polymerization step for a water soluble unsaturated monomer and a drying step for the obtained water-containing crosslinked polymer, wherein the polymerization step is for polymerizing acrylic acid with a carbon stable isotope ratio ($\delta^{13}C$) of −20‰ or higher as the water-soluble unsaturated monomer.

Also, to explain the above-mentioned two production methods (the first process invention and the second process invention) in other words, the present invention provides a method for producing a polyacrylic acid (salt) selected from a water soluble polyacrylic acid (salt) and a water insoluble and water-swelling polyacrylic acid (salt) by carrying out a polymerization step for a water-soluble unsaturated monomer and a drying step for the obtained water-containing crosslinked polymer, in which the polymerization step is for polymerizing acrylic acid with a carbon stable isotope ratio ($\delta^{13}C$) of −20‰ or higher as the water-soluble unsaturated monomer in order to solve the above-mentioned problems.

Further, to solve the above problems, the present invention is a method for identifying a polyacrylic acid (salt) after production (particularly, a polyacrylic acid (salt)-type water-absorbing resin), wherein $^{13}C$ volume of the polyacrylic acid (salt) (preferably $^{13}C$ volume before polymerization which is used for producing the polyacrylic, acid (salt)) is quantitatively analyzed.

Also, to solve the above problems, the present invention is a method far tracing a polyacrylic acid (salt) after production (particularly, a polyacrylic acid (salt)-type water-absorbing resin), wherein $^{13}C$ volume of the polyacrylic acid (salt) (preferably $^{13}C$ volume before polymerization which is used for producing the polyacrylic acid (salt)) is quantitatively analyzed.

Effects of the Invention

The present invention makes it possible to identify and trace a water-absorbing resin distributed on the market after its production by quantitatively analyzing $^{13}C$. Also, the present invention provides a $CO_2$-reducing and carbon-neutral water-absorbing resin since a C4 plant is used as a carbon source for acrylic acid in order to control the $^{13}C$ amount.

BRIEF DESCRIPTION OF DRAWINGS

FIG. 1 is an explanatory drawing of the case using a number of raw materials (several disparate acrylic acids).

MODE FOR CARRYING OUT THE INVENTION

Hereinafter, the polyacrylic and (salt), especially the polyacrylic acid (salt)-type water absorbing resin of the present invention and a method for producing the same will be described in detail; however, the scope of the present invention is not restricted to the following description, and those other than the following examples can be properly modified and carried out in a range where the gist of the present invention is not Unpaired. Specifically, the present invention is not limited to each of the following embodiments, and various modifications can be made within a range shown by the claims and embodiments carried out by properly combining each technical means disclosed with different embodiments are also included within the technical scope of the present invention.

[1] Definition of Terms (1-1) "Water-Absorbing Resin"

In the present invention, a "water-absorbing resin" means a water-swellable and water insoluble polymer gelling agent. Here in, a "water-swelling property" means a CRC (water absorption capacity without load) defined in ERT 441.2-02 in amount of usually 5 [g/g] or more, preferably 10 to 100 [g/g], still more preferably 20 to 80 [g/g]. And a "water-insolubility" means a Ext (water extractables) defined in ERT 470.2-02 in amount of usually 0 to 50 mass %, preferably 0 to 30 mass %, still more preferably 0 to 20 mass %, particularly preferably 0 to 10 mass %.

The water-absorbing resin may be properly designed in accordance with the application and is not particularly limited, but preferably a hydrophilic crosslinked polymer obtained by crosslinking polymerization of an unsaturated monomer having a carboxyl group. Also, the water absorbing resin is not limited to a substance entirely (100 mass %) composed of a polymer but may contains an additive or the like to an extent that the above-mentioned properties can be maintained. That is, even a water-absorbing resin composition is named so called as a water-absorbing resin in the present invention. The content of the polyacrylic acid (salt)-type water-absorbing resin is preferably 70 to 99.9 mass % relative to the entire water-absorbing resin, more preferably 80 to 99.7 mass %, and still more preferably 90 to 99.5 mass %. The components other than the water absorbing resin are preferably water in terms of the water absorption speed and impact resistance of powders (particles) and may include, if necessary, additives described below.

(1-2) "Polyacrylic Acid (Salt), Polyacrylic Acid (Salt)-Type Water-Absorbing Resin"

In the present invention, a "polyacrylic acid (salt)-type water-absorbing resin" means a water absorbing resin that is formed mainly of acrylic acid and/or its salt (hereinafter mentioned as acrylic acid (salt)) as the repeating unit and that contains optionally graft components.

Also, "polyacrylic acid (salt)" is defined as highest conception of polyacrylic acid (salt)-type water-absorbing resin and, in the present invention, water soluble polyacrylic acid (salt) is included. That is, it is called polyacrylic acid (salt)-type water soluble polymer or water soluble polyacrylic acid (salt) when polyacrylic acid (salt) is dissolved substantially 100% in water. Additionally, "polyacrylic acid (salt)", in the present invention, is selected from water soluble polyacrylic acid (salt) or water insoluble and water-swelling polyacrylic acid (salt) (also known as: polyacrylic acid (salt)-type water-absorbing resin), and from the view point of the effect, polyacrylic acid (salt)-type water-absorbing resin is preferable.

More specifically, the polyacrylic acid (salt) means a water-absorbing resin that contains acrylic acid (salt) as a total monomer (except cross-lining agents) used for polymerization of the polyacrylic add (salt) in an amount of usually 50 to 100 mol %, preferably 70 to 100 mol %, more preferably 90 to 100 mol %, and particularly preferably substantially 100 mol %. The salt as the polymer may include necessarily water-soluble salts, preferably monovalent salts, still more preferably alkali metal salts, ammonium metal salts or ammonium salts, still more preferably alkali metal salts and particularly preferably sodium salts.

(1-3) "EDANA" and "ERT"

"EDANA" is an abbreviated expression for European Disposables and Nonwovens Associations, and "ERT" is an abbreviated expression for the measurement methods of water absorbing resins (EDANA Recommended That Method) under the European standards (approximately the world standards). Additionally, in the present invention, the physical properties of water-absorbing resins are measured by reference to the original text of ERT (known literature, revised in 2002), unless otherwise indicated.

(a) "CRC" (ERT441.2-02)

The "CRC" is an abbreviation for Centrifuge Retention Capacity and means water absorption capacity without load (simply sometimes referred to as "water absorption rate"). Specifically, the CRC is the water absorption rate (unit; [g/g]) after 0.2 g of a water-absorbing resin in a nonwoven fabric bag is freely swollen in 0.9 mass % sodium chloride aqueous solution for 30 minutes and dewatered by a centrifuge.

(b) "AAP" (ERT442.2-02)

The "AAP" is an abbreviation for Absorption Against Pressure and means water absorption capacity under load. Specifically, the APP is the water absorption rate (unit; [g/g] after swollen in 0.9 mass % sodium chloride aqueous solution for 1 hour under 2.06 kPa (0.3 psi) load. Additionally, the measurement is carried out by changing loading condition at 4.83 kPa (0.7 psi).

(c) "Ext" (ERT 470.2-02)

"Ext" is an abbreviation for Extractables and means the amount of water soluble components (water dissolve component amount). Specifically, measurement is carried out by adding 1 g of the water-absorbing resin to 200 g of an 0.9 mass % sodium chloride aqueous solution, stirring the solution at 500 rpm for 16 hours, and measuring the amount of a dissolved polymer by pH titration (unit: mass %).

(d) "FSC" (ERT440.2-02)

"FSC" is an abbreviation for Free Swell Capacity and means free swell magnification, Specifically, it is the water absorption rate (unit: [g/g]) after 0.20 g of the water-absorbing resin is dipped in 0.9 mass % sodium chloride aqueous solution for 30 minutes and measuring thereof without dewatering by a centrifuge.

(e) "Residual Monomers" (ERT411.2-02)

The "residual monomers" means the amount of monomers remaining in a water absorbing resin. Specifically, the amount of monomers is a value (unit: ppm) obtained by measuring, after 1.0 g of the water-absorbing resin is charged to 200 cm3 of 0.9 mass % sodium chloride aqueous solution and the resultant is stirred at 500 rpm for 1 hour, the amount of monomers dissolved in the aqueous solution by using HPLC (high-pressure liquid chromatography).

(f) "PSD" (ERT420.2-02)

The "PSD" is an abbreviation for Particle Size Distribution, and means the particle size distribution measured by sieving classification. Additionally, the mass average particle diameter (D50) and the particle diameter distribution width can be measured by the same method as in "(1) Average Particle Diameter and Distribution of Particle Diameter" described in European Patent No. 0349240, p. 7, lines 25-43.

(1-4) "Liquid Permeability"

The "liquid permeability" means the flow of a liquid flowing among particles of swollen gel under a lead or no load. The "liquid permeability" can be measured by SFC (Saline Flow Conductivity) or GBP (Gel Bed Permeability) as a representative measurement method.

The "SFC" (Saline Flow Conductivity) is liquid permeability of 0.69 mass % saline in water-absorbing resin at a load of 0.3 psi. It is measured awarding to an SFC testing method described in U.S. Pat. No. 5,669,894.

The "GBP" is liquid permeability of 0.69 mass % saline in water-absorbing resin under a loud or a free swell. It is measured according to a GBP testing method described in International Publication 2005/016393 pamphlet.

(1-5) "Initial Color Hue and Color Hue with the Lapse of Time"

"Initial color hue" in the present invention means the color hue of a water-absorbing resin just after its production or release to users. Usually, the color before factory release is managed as the initial color hue. With respect to the measurement method of color hue, there may be exemplified the methods (Lab values, YI values, WB values, and the like) disclosed in International Publication 2009/005114.

Also, "Color hue with the lapse of time" maims the color change of a water-absorbing resin after stored in an unused state for a long period of time or during its distribution. Water absorbing resins are colored over time, which may lead to a decrease in the commercial value of disposable diapers. The color hue with the lapse of time develops over several months to several years, and therefore, examination is carried out by the accelerating test (accelerating test under high temperature and high humidity) disclosed in International Publication 2009/005114.

(1-6) "Biomass"

In the present invention, "biomass" means industrial resources derived from substances composing neontological living things other than exhaustible resources, that is, reproducible organic resources derived from biological material excluding fossil resources.

Biomass takes in carbon dioxide m the atmospheric air by photosynthesis in its growth process, Consequently, even if biomass is burned and carbon dioxide is emitted, the carbon dioxide amount in the atmospheric air does not increase as a whole. This characteristic is referred to as carbon neutral and is a preferable characteristic from the viewpoint of global environment.

Biomass may be derived from a single substance or a mixture. Examples thereof include cobs, stems and leaves of corn, grass, and leaves and biomass is not limited to bio-fuel harvests, and agricultural residues, municipal refuse, industrial wastes, sediments of paper manufacturing industries, wastes in grasslands, wastes of wood and forest, and the like are also included.

(1-7) "Carbon Stable Isotope Ratio ($\delta^{13}C$)"

"carbon stable isotope ratio ($\delta^{13}C$)" in the present invention means the ratio of $^{13}C$ to $^{12}C$ among three kinds of isotopes of carbon atoms existing in nature (abundance ratio $^{12}C:^{13}C:^{14}C=98.9=1.11:1.2\times10^{-12}$ unit: %) and the carbon stable isotope ratio is expressed by the deviation to the standard substance and defined as a value ($\delta$ value) defined by the following mathematic expression.

$$\delta^{13}C\ [‰]=[(^{13}C/^{12}C)_{sample}/(^{13}C/^{12}C)_{PCB}-1.0]\times 10000 \qquad [\text{Mathematic 1}]$$

Additionally, "$(^{13}C/^{12}C)$ sample" means a stable isotope ratio of a sample of the present invention and "$(^{13}C/^{12}C)_{PDB}$" means a stable isotope ratio of a standard substance. PDB is on abbreviation for "Pee Dee Belemnite" and means a fossil of a belemnite containing calcium carbonate (a fossil of a belemnite excavated from a Pee Dee layer of South Carolina as the standard substance) and is used as a standard sample for the $^{13}C/^{12}C$ ratio. The "carbon stable isotope ratio ($\delta^{13}C$)" is measured by accelerator mass spectrometry method (an AMS method; Accelerator Mass Spectrometry). Additionally, since the standard substance is rare, a working standard of which the stable isotope ratio to the standard substance is known can also be used.

(1-8) Tracer/Traceability

Tracer/traceability means a trace substance added and characteristic for the follow-up investigation of the distribution state and range. In the present invention, a water-absorbing resin with $^{13}C$, still more preferably $^{14}C$, within a specified range is used and any water-absorbing resin having a specified $^{13}C$ amount defined by the present invention and baying traceability enabling distinction of the resin from commercialized or publicly known water-absorbing resins based on $^{13}C$ (and $^{14}C$ amount) is within the scope of the present invention, regardless of actual execution of a follow-up investigation ($^{13}C$ amount and $^{14}C$ amount) for the water-absorbing resin after production or after marketing.

Additionally, as a method for identifying a polyacrylic acid (salt), particularly, a polyacrylic acid (salty-type water-absorbing resin after its production, and an acrylic acid raw material before polymerization which is used for producing the polyacrylic acid (salt), particularly, the polyacrylic acid (salt)-type water-absorbing resin, if the carbon stable isotope ratio ($\delta^{13}C$) of the acrylic acid raw material used for the production of the polyacrylic acid (salt), particularly, the polyacrylic add (salt)-type water-absorbing resin is previously determined by accelerator mass spectrometry method before polymerization the identification can be done by comparing the measured value with a measured value of the carbon stable isotope ratio ($\delta^{13}C$) of a polyacrylic acid (salt), particularly, a polyacrylic acid (salt)-type water-absorbing, resin after production.

Also, as a method for tracing acrylic acid before polymerization used for producing a polyacrylic acid (salt), particularly, a polyacrylic acid (salt)-type water-absorbing resin from the polyacrylic acid (salt), particularly, the polyacrylic acid (salt)-type water-absorbing resin alter production, if the carbon stable isotope ratio ($\delta^{13}C$) of the acrylic acid raw material before polymerization used for the production of the polyacrylic acid (salt), particularly, the polyacrylic acid (salt)-type water-absorbing resin or the carbon stable isotope ratio ($\delta^{13}C$) of an intermediate product during the production process is previously determined, an intermediate product or a raw material can be traced from the carbon stable isotope ratio ($\delta^{13}C$) of a polyacrylic acid (salt), particularly, a polyacrylic acid (salt)-type water-absorbing resin after production. Consequently, since a raw material and a production process can be traced from a product (water-absorbing resin), in the case where a product has something undesirable, it is made easy to investigate or examine the production line, a raw material, and the like.

(1-9) Radiocarbon Dating Method ($^{14}C/C$)

Biomass-derived carbon in the present invention is carbon which existed in form of carbon dioxide in the atmospheric air and was taken in a plant and now exists in acrylic add synthesized using the plant as a raw material and is accordingly identified by measuring the radioactive carbon (that is, carbon 14).

Also, the content ratio of a biomass-derived component can be specified by measuring the radioactive carbon (carbon 14). That is, the ratio of biomass-derived carbon to carbon contained in a sample can be calculated by measuring the concentration of carbon 14 in the sample and carrying out inverse calculation using the content ratio of carbon 14 in the atmospheric air (107 pMC (percent modern carbon)) since carbon 14 atoms scarcely remain in a fossil raw material such as petroleum and the like.

The measurement of the abundance ratio of the biomass-derived carbon based on radioactive carbon measurement can be carried out by, for example, converting a sample (water absorbing resin) into $CO_2$ or C (graphite) if necessary, and subsequently, measuring by an accelerator mass spectrometer (AMS), and comparing the content of carbon 14 with that of a standard substance (e.g., U.S. NIST oxalic add). The content ratio (%) of the biomass-derived carbon can be calculated as [(amount of biomass-derived carbon in sample)/(total carbon amount in sample)×100].

Herein, the ratio of a nonfossil raw material and a fossil raw material of a polyacrylic acid (salt) can be determined by measuring the above-mentioned $^{14}C/C$ and it can be determined as commercialized polyacrylic acid (salt)-type water-absorbing resins obtained from propylene derived from petroleum. The ratio (pMC) of a nonfossil raw material is preferably 1% or more, 10% or more, 50% or more, 70% or more, 90% or more, and particularly 99% in carbon. The present invention has the following advantageously excellent physical properties which a conventional natural product-based water absorbing resin (e.g., carboxymethyl cellulose) cannot have.

That is, to solve the above problems, the present invention provides a polyacrylic acid (salt), particularly, a polyacrylic acid (salt)-type water absorbing resin and a method for producing the same, which shows a carbon stable isotope ratio ($\delta^{13}C$) of −20‰ or more when measured by accelerator mass spectrometry method and pMC is preferably 1% or more, 10% or more, 50% or more, 70% or more, 90% or more, particularly 99% or more.

(1-10) Others

In this specification, "X to Y" showing a range means "X or more, Y or lower". Also, the unit of mass "t (ton)" means "Metric ton", and further, "ppm" means "ppm by mass" unless otherwise indicated. "mass" and "weigh", "mass %" and "weight %", also "parts by mass" and "parts by weight" is used as a synonym, and further, " . . . acid (salt)" means " . . . acid and/or its salt", "(meth) acrylic" means "acrylic and/or meth acrylic".

[2] A Process for Producing Polyacrylic Acid (Salt), Specifically Polyacrylic Acid (Salt)-Type Water-Absorbing Resin (2-1) Acrylic Acid Production Step The present step is a step to obtain acrylic add, specifically acrylic acid made from biomass used as a raw material for polyacrylic acid (salt), specifically polyacrylic acid (salt)-type water-absorbing resin.

(Carbon Stable Isotope Ratio)

The present invention provides a polyacrylic acid (salt)-type water-absorbing resin having a carbon stable isotope ratio ($\delta^{13}C$) measured by accelerator mass spectrometry method of −20‰ or higher. As a production method of the water-absorbing resin, it provides a method for producing a water-absorbing resin which is a method for producing a polyacrylic acid (salt)-type water-absorbing resin comprising a polymerization step for a water-soluble unsaturated monomer and a drying step for the obtained water-containing gel-like crosslinked polymer, wherein polymerizing acrylic acid with a carbon stable isotope ratio ($\delta^{13}C$) of −20‰ or higher.

Also, the present invention is applicable to a water-soluble polyacrylic acid (salt) in addition to a water-insoluble and water-swelling polyacrylic acid (salt) (also known as: polyacrylic acid (salt)-type water-absorbing resin) and provides as a polyacrylic acid (salt) and a method for producing the same as broader concept.

That is, the present invention provides a polyacrylic acid (salt) having a carbon stable isotope ratio ($\delta^{13}C$) measured by accelerator mass spectrometry method of −20‰ or higher wherein the polyacrylic acid (salt) is selected from a water-insoluble and water-swelling polyacrylic acid (salt) and a water-soluble polyacrylic acid (salt). As a production method of the polyacrylic acid (salt), it provides a method for producing a polyacrylic acid (salt) which is a method for producing a polyacrylic acid (salt) comprising a polymerization step for a water-soluble unsaturated monomer, wherein polymerizing acrylic acid with a carbon stable isotope ratio ($\delta^{13}C$) of −20‰ or higher.

From the view point of traceability (preferably sustainability in addition to it), above mentioned carbon stable isotope ratio ($\delta^{13}C$) of the polyacrylic acid (salt) and particularly the polyacrylic acid (salt)-type water-absorbing resin is in the range of −20‰ or more, preferably −20 to −5‰, more preferably −18 to −8‰, still more preferably −17 to −9‰, particularly preferably −15 to −10‰. If the carbon stable isotope ratio ($\delta^{13}C$) is lower than −20‰, it is difficult to distinguish acrylic acid from a conventional polyacrylic acid derived from a fossil raw material (petroleum) and if the carbon stable isotope ratio ($\delta^{13}C$) exceeds −5‰, it becomes difficult to refine acrylic acid and it results in an undesirable consequence in terms of the cost for a water-absorbing resin which is mainly used for disposable uses, therefore it not preferable.

The inventors of the present invention have paid attention to that a carbon stable isotope ratio ($\delta^{13}C$) of acrylic acid and a polyacrylic acid (salt) derived from a fossil raw material is less than −20‰ and also C3 plants occupying 90% or more of plants on earth have a carbon stable isotope ratio ($\delta^{13}C$) of less than −20‰, and, on the other hand, that specified plants (C4 plants that are minor plants) have a carbon stable isotope ratio ($\delta^{13}C$) of −20‰ or higher, and found that it is possible to clearly distinguish a water-absorbing resin from conventional water-absorbing resins and acrylic acid derived from almost all plants (C3 plants) by producing acrylic acid from C4 plants as a main raw material of biomass. This finding now led to completion of the present invention.

That is, it is found that in the case where a fossil raw material is used as in the case of conventional acrylic acid, $\delta^{13}C$ of acrylic acid is less than −20‰, whereas, in the case where a C4 plant is used, $\delta^{13}C$ of acrylic acid is −20‰ or higher. Paying attention to the function of $\delta^{13}C$ as a tracer based on the above-mentioned difference, the present invention provides a polyacrylic acid (salt)-type water-absorbing resin with a carbon stable isotope ratio ($\delta^{13}C$) of −20‰ or higher and distinguishable from conventional water-absorbing resins by using a specified raw material, particularly, a C4 plant as a carbon source.

Polyacrylic acid (salt) type-water absorbing resin of the present invention and acrylic acid for obtaining of the water-absorbing resin will be described below.

(Acrylic Acid)

In order to obtain a polyacrylic acid (salt)-type water-absorbing resin with a carbon stable isotope ratio ($\delta^{13}C$) of −20‰ or higher in the present invention, acrylic acid is used as a monomer for a main component and the monomer may have a carbon stable isotope ratio ($\delta^{13}C$) of −20‰ or higher.

That is, the carbon stable isotope ratio ($\delta^{13}C$) of acrylic acid may be −20‰ or higher, and is preferably −20 to −5‰, more preferably −18 to −8‰, still more preferably −17 to −9‰, particularly preferably −15 to −10‰ and use of the acrylic acid can give a polyacrylic acid (salt), particularly, a polyacrylic acid (salt)-type water-absorbing resin within the above-mentioned range.

Additionally, although remaining trace amount of a cross-linking agent, an additive, a grafting component and the like to be used if necessary, a main component of carbon source thereof, preferably 70 mass or more, more preferably 90 mass % or more, still more preferably 95 mass % or more, and particularly preferably 99 mass % or more is derived from acrylic acid so that the carbon stable isotope ratio ($\delta^{13}C$) and $^{14}C/C$ of the polyacrylic acid (salt) can be controlled by controlling the carbon stable isotope ratio ($\delta^{13}C$) of acrylic acid.

Accordingly, acrylic acid to be used in the present invention may be those which can give a carbon stable isotope ratio ($\delta^{13}C$) of −20‰ or higher to a water-absorbing resin to be obtained. A production method thereof is not particularly limited and acrylic acid with a carbon stable isotope ratio ($\delta^{13}C$) of −20‰ or higher can be obtained by obtaining acrylic acid using as C4 plant as a carbon source, for example, using acrylic acid produced from a C4 plant via biopropylene, glycerin, 3-hydroxypropionic acid, 2-hydroxypropionic acid, glucose, and the like. $^{14}C/C$ of acrylic acid obtained from such a C4 plant can be adjusted based on the ratio of the C4 plant in its raw materials and it is $1.0 \times 10^{-14}$ or more and further, within the range of the above-mentioned $^{14}C$ amount.

Herein, since the carbon stable isotope ratio ($\delta^{13}C$) of acrylic acid mainly depends on the carbon stable isotope ratio ($\delta^{13}C$) of raw materials, the carbon stable isotope ratio ($\delta^{13}C$) of acrylic acid and a polyacrylic acid (salt) to be obtained may be adjusted by properly mixing (e.g., use of a C3 plant as a carbon source in combination and, the like) acrylic acid raw materials with different carbon stable isotope ratios (the above-mentioned raw materials derived from different plant raw materials). Additionally, the C4 plant to be used as a raw material main component is preferably in an amount of 50 mass % or more of carbon source, more preferably 60 mass % or more, 70 mass % or more, (30 mass % or more, 90 mass % or more in this order, and particularly preferably 100 mass %. Herein, "C4 plant in an amount of 50 mass % or more of carbon source" means, for example, in the case where acrylic acid is obtained from glycerin derived from plants, 50 mass % or more of glycerin is derived from a C4 plant.

(C3 Plant and C4 Plant)

Plants are classified into 3 types: C3 plants, C4 plants, and crassulacean acid metabolism (CAM/Crassulacean Acid Metabolism) plants based on types of initial carbon dioxide fixation products in the photosynthetic carbon dioxide fixation pathway. Among crops, corn and cereals belong to C4 plants, main crops such as rice and wheat belong to C3 plants, and Cactaceae, Crassulaceae, Euphorbiaceae, and the like belong to CAM plants.

90% or more of plants on earth belong to C3 plants and, for example, agriculturally valuable plants such as rice, wheat and barley, tobacco and the like am included therein. An enzyme relevant to $CO_2$ fixation in the photosynthetic pathway of C3 plants is ribulose-1,5-diphosphate carboxylase, which has low affinity to $CO_2$ but has high affinity to oxygen and thus the enzyme has a low $CO_2$ fixation reaction efficiency and a low photosynthesis reaction efficiency. On the other hand, plants having only the Calvin-Benson cycle are called as C3 plants.

On the other hand, C4 plants are plants which carry out C4 type photosynthesis, that is one form of photosynthesis having C4 pathway for concentrating $CO_2$ besides the Calvin-Benson cycle, which is a common $CO_2$ reduction cycle in the photosynthesis process. The enzyme relevant to $CO_2$ fixation in the photosynthetic pathway of C4 plants is phosphoenolpyruvate carboxylase. This enzyme is not inhibited in the activity by oxygen, has high $CO_2$ fixation performance, and C4 plants are characterized in that advanced chloroplasts exist also in bundle sheath cells. Typical examples of C4 plants include corn, sugar cane, sorghum, pampas grass, guinea grass, Rhodes grass, *Urochloa subquadripara, Brachiaria subquadripara, Echinochloa esculents, Eleusine coracana, Kochia scoparia*, and the like and *KoKia scoparia* is named also as summer cypress, Holtigi, and *Kachia green*. Since C4 plants consume excess energy for fixation of $CO_2$, C4 plants can more efficiently fix $CO_2$ than normal. Also, common plants less collect $CO_2$ at the time of high temperature, but C4 plants do well unlike them. Moreover, C4 plants sufficiently carry out photosynthesis with little water, That is, physiological adaptation to deal with extreme weather conditions such as high temperature, dryness, low $CO_2$ and nitrogen-poor soil severe for plants. C4 plants and their mixtures are employed widely as a carbon source as long as the carbon stable isotope ratio ($\delta^{13}C$) is −20‰ or higher and in terms of the production volume and cost, corn, sugar cane, and their waste molasses are preferably used as a carbon source. As plants besides C3 plants and C4 plants, CAM plants have a photosynthetic system adapted to dry environments and this photosynthetic system is considered to be one advanced morphology of C3 photosynthesis. The carbon stable isotope ratio ($\delta^{13}C$) of CAM plants is generally in the range of about −35 to −10‰ and these CAM plants can be used as a biomass raw material in combination if necessary.

In the present invention, the inventors have paid attention to that the carbon stable isotope ratio ($\delta^{13}$) of a C4 plant is different from those of other plants and fossil raw materials (particularly, petroleum) and have completed the present invention.

(Fats and Oils and BDF)

Examples known as fats and oils which are esters of fatty acids and glycerin include fats and oils derived from C3 plants such as rice oil, rice bran oil and the like, as well as fats and oils derived from C4 plants such as corn oil, soybean oil, sesame oil, sunflower oil and the like, and further fats and oils derived from animals such as whale oil, shark oil, liver oil and the like. Also, those which are usable as raw materials for biodiesel fuel (BDF) are fats and oils derived from various C3 plants, C4 plants, and animals; for example, as raw materials for biodiesel fuel (BDF) plant oils such as rape seed oil, palm oil (obtained form oil palm and coconut palm), olive oil, sunflower oil, peanut oil, sesame oil, soybean oil, rice oil, hemp oil and the like; fish oils and tallow such as lard, beef tallow and the like; and waste edible oils (for example, so-called Tempura oil) and the like, Rape seed oil is used in Europe; *Pistacia chinensis* and the like in China; soybean oil in North America and Latin America; and oils obtained from oil palm and coconut palm, and *Jatropha curcas* in Southeast Asia.

In the present invention, it is also preferable to obtain acrylic acid by using these fats and oils, BDF, and glycerin which is a byproduct as a carbon source. Fats and oils may be fatty oils (liquid at normal temperature) or fats (solid at normal temperature). Further, drying oils, semi-drying oils, and nondrying oils are also usable. Conventionally, International Patent Applications PCT/JP2010/51822 and PCT/JP2010/51832, U.S. Patent Application Publication No. 2007/0219521, and the like disclose techniques for obtaining acrylic acid from glycerin derived from fats and oils and obtaining a water-absorbing resin; however, these techniques do not at all pay attention to the $^{13}$C volume and the traceability of fats and oils as a raw material. In the meantime, the present invention is characterized by selecting the $^{13}$C volume of a carbon source as one example of a production method of acrylic acid with specified $^{13}$C and a water-absorbing resin, which is apparently different from a conventional polyacrylic acid-type water-absorbing resin derived from a natural product.

Additionally, the above-mentioned U.S. Patent (U.S. Patent Application Publication No. 2007/0219521) discloses an absorbent article containing a polymer derived from a renewable resource and the method of producing said article (Absorbent article comprising a synthetic polymer derived from a renewable resource and methods of producing said article) (for example, claims 1 to 3, 6, 7, etc.) and in Example 2 in this application, it is described that a polyacrylic acid (salt)-type water-absorbing resin with an AAP of 21 [g/g] and a SFC of 50 [×10$^{-7}$·cm$^3$·s·g$^{-1}$] is obtained by obtaining acrylic add from glycerin derived from canola oil (C3 plant) and polymerizing, drying, pulverizing, and surface-crosslinking the acrylic acid; however, the description does not at all describe or suggest PSD (particle size distribution/850 to 150 µm), water absorption speed (FSR), addition of a polyvalent metal, inorganic fine particles, polyamine polymers, and the like, and use of a polymerization inhibitor (particularly, p-methoxyphenol).

On the other hand, the present invention discloses use of a C4 plant as a raw material of acrylic acid as one example of means for accomplishing the object of the invention and the traceability and physical properties can be further improved by controlling the above-mentioned physical properties and adding a trace component in addition to the $^{13}$C volume/$^{14}$C volume and thus the present invention is different from the above-mentioned U.S. patent.

(Production Method of Acrylic Acid and Nonfossil Raw Material)

A method for producing acrylic acid in the present invention is not particularly limited as long as the carbon stable isotope ratio ($\delta^{13}$C) is −20‰ or higher and acrylic acid obtained from biomass derived from a C4 plant is preferable. For example, Acrylic acid may be obtained by dehydrating, oxidizing, fermenting, and the like of a nonfossil raw material obtained from a C4 plant, particularly a natural product.

In the present state where the water-absorbing resin is consumed and disposed by in a large amount in form of disposable diapers and the like, the raw material is preferably renewable and sustainable; that is, it is preferable to obtain the water-absorbing resin and its raw material from a nonfossil raw material. Examples usable as the nordessil raw material include glycerin, 2-hydroxypropionic acid (also known as lactic acid), 3-hydroxypropionic acid (3-HPA), and biopropylene, and such glycerin and hydroxyprupionic acid may be obtained from specified plants (C4 plants and CAM plants). Hydroxypropionic acid may be obtained by a chemical oxidation reaction or a fermentation method from glucose and saccharides. The glucose can be obtained from waste molasses (byproduct containing components other than saccharides produced at the time of relining sugar), starch, cellulose, and the like and the carbon stable isotope ratio in acrylic acid can be controlled by selecting a C4 plant as a natural product raw material for starch/cellulose/sugar (sugar cane and sugar beet). The biopropylene can be obtained from bioethanol and its dehydrated product, such as bioethylene and the like. Such biopropylene can be oxidized by the same method as that in the case of propylene derived from fossil petroleum (fossil raw material) to obtain acrylic acid via acrolein.

One example of such production methods of the water-absorbing resin and acrylic acid is a method of obtaining acrylic acid furan a C4 plant and obtaining the water-absorbing resin from the acrylic acid. Glycerin can be obtained by saponification or esterification (BDF conversion) of fats and oils or fermentation of starch and cellulose. Plants to be used as a raw material for starch may be corn, sugar cane, and the like. Cellulose can be obtained from various kinds of plants. Various kinds of plant fats and oils can be used as fats and oils.

A typical acrylic add production method is a production method involving dehydration reaction of glycerin, 2-hydroxypropionic acid (also known as lactic acid), 3-hydroxypropionic acid, and the like and a water absorbing resin with a carbon stable isotope ratio ($\delta^{13}$C) of −20‰ or higher to be used in the present invention can be obtained by obtaining such glycerin and hydroxypropionic acid from a C4 plant. 2- or 3-Hydroxypropionic acid (also known as lactic acid) can be obtained by fermentation of cellulose and glucose and in order to obtain acrylic acid of the present invention, cellulose and glucose derived from a C4 plant may be used.

(Production of Acrylic Acid with Prescribed $\delta^{13}$C from Glycerin)

Methods for producing an acrylic acid-based water-absorbing resin from a nonfossil raw material are exemplified in International Publication Nos. 2006/092271, 2006/092272, 2006/136336, 2008/023039, 2008/023040, 2007/109128 and the like, for example. These six patent documents do not at all pay attention to the $^{13}$C volume and its traceability and do not suggest the method for producing the water-absorbing resin of the present invention. Also, U.S. Patent Application Publication No. 2007/0219521 is as described above.

Also, methods for producing acrylic acid from a nonfossil raw material are exemplified in international Publication Nos. 2006/08024, 2007/119528, and 2007/132026, U.S. Patent Application Publication No. 2007/0129570 and the like, for example.

(Production of Acrylic Acid With Prescribed $\delta^{13}C$ From Biopropylene)

Presently, a method for producing propylene derived from biomass is exemplified in place of a cracking method of crude oil, a fossil resource, regarding propylene used as a raw material far acrylic acid. Concrete examples include a metathesis reaction of butene and ethylene; a dehydration reaction of propanol; a dehydration reduction reaction of glycerin; contact cracking of butane; a, GTL synthesis reaction of biogas (synthesized gas); a MTO synthesis reaction from biogas (synthesized gas) via methanol synthesis; dehydrogenation reaction of biopropylene or biomass propane via bioethanol or bioethylene, which is a dehydration product of bioethanol; and the like. After biopropylene with a specified $^{13}C$ volume is obtained, acrolein and subsequently acrylic acid may be obtained from propylene according to a common acrylic acid production method.

(Production of Acrylic Acid With Specified $\delta^{13}C$ From Hydroxypropionic Acid)

In order to obtain acrylic acid with a specified $\delta^{13}C$, 3-hydroxypropionic acid or 2-hydroxypropionic acid may be obtained from the above mentioned biomass with the specified $\delta^{13}C$ via glucose and the like and subsequently the 3-hydroxypropionic acid or 2-hydroxypropionic acid may be dehydrated to obtain acrylic acid.

(Production of Hydroxypropionic Acid)

Methods for obtaining 3-hydroxypropionic acid (3-HPA) from glycerin are exemplified in U.S. Pat. No. 6,852,517 and JP-A-2007-082470 and JP-A-2005-102533. A method for obtaining 2-hydroxypropionic acid (lactic acid) from glycerin is exemplified in JP-A-4-356436. Methods for obtaining 3-hydroxyropionic acid from β-alanine are exemplified in International Publication Nos. 2002/042418 and 2007/042494. In the case of obtaining 3-hydroxypropionic acid, a technique disclosed in International Publication No. 2010/0118743 may be employed to improve the durability to hydroxypropionic acid and conversion of hydroxypropionic acid into aldehyde aldehyde is preferably inhibited by a technique disclosed in International Publication No. 2010/0118743. One example is a method of producing 3-hydroxypropionic acid by using 3-hydroxypropionic acid dehydrogenase after producing malonic acid semi-aldehyde by decarbonating oxaloacetic acid.

(Dehydration of Hydroxypropionic Acid)

Methods for obtaining acrylic acid from hydroxypropionic acid by dehydration are exemplified in International Publication Nos. 2002/090312, 2003/08795, 2005/095320, 2007/106099, and 2008/1042958, U.S. Patent Application Publication No. 2007/219391, and the like. The un-neutralized hydroxypropionic acid to be dehydrated may be used in form of the acid or a salt thereof (particularly, a monovalent salt, more particularly, a sodium salt or an ammonium salt) and at this time, a solvent may be used or does not have to be used. The obtained acrylic acid may be refined by crystallization, distillation, or the like, and the acrylic acid crystallization method may be carried out continuously or in a batch manner in a layered or dispersion form and is exemplified in, for example, International Publication No. 2008/023039 and the like. Additionally, it is required to take acrylamide by-product into consideration for dehydration of ammonium hydroxypropionate.

The dehydration reaction of 3-HPA is caned out in the presence of or in the absence of a catalyst and in the case of using a catalyst, an acid catalyst is preferably used. The condition of the dehydration reaction is normal pressure or reduced pressure and a heating temperature of 100 to 300° C., more preferably 150 to 250° C.

The obtained HPA salt may be one selected from alkali metal salts, alkaline earth metal salts, and combinations thereof. Examples of a typical salt include a sodium salt and a calcium salt, The dehydration reaction for producing α,β-unsaturated carboxylic acid or a salt thereof may be carried out in a water based medium owing to the water-based medium solubility of HPA.

Optionally, α,β-unsaturated carboxylic acid or a salt thereof may be produced by adding a dehydrase along with heating of an aqueous solution and thereby intensifying dehydration of the acid or acidic salt. The dehydration process in a water-based medium can be catalyzed by using an acidic or basic material. The dehydration catalyst may be a neutral, acidic, or basic material which accelerates the dehydration. Examples of a neutral catalyst include calcium phosphate, calcium lactate, and calcium 3-hydroxypropionate. Other useful catalysts include aluminium oxide, silicon oxide, titanium oxide, zirconium oxide, zeolite, and also Lewis acid, Amines are basic compounds usable as the catalyst. In the case where fermented bouillon is used for providing hydroxypropionic acid, a basic amine can conveniently perform functions of both a function as an extractant for separating hydroxypropionic acid from water-based fermented bouillon and a function as a dehydration catalyst. Examples of an amine suitable for this process include tricaprylamine (TCA), tridecylamine (TDA), and tridodecylamine (TDDA). Further, use of another exogenous basic material can cause dehydration. Concretely, metal oxides and hydroxides, for example, calcium oxide and calcium hydroxide, are basic materials which can intensify and assist dehydration. An acid catalyst may be a gaseous or liquid-phase strong mineral acid, for example, hydrochloric acid, sulfuric acid, or phosphoric acid. An insoluble acid resin, for example, AMBERLYST (registered trademark) resin, NAFION (registered trademark) resin, and acidic DOWEX (registered trademark) resin can be employed as a catalyst. A particularly useful acid catalyst is phosphoric acid.

Dehydration by steam conversion (e.g., vapor-phase reaction) can give an α,β-unsaturated carboxylic acid. In such a method, an aqueous solution containing hydroxypropionic acid can be converted into acrylic acid by evaporating the solution at a relatively high temperature, preferably, in the presence of a dehydration catalyst.

($^{14}C$ Volume)

In the case where a natural substance (particularly, a nonfossil raw material) is used as a raw material of acrylic acid or in the case where acrylic add derived from a fossil raw material described later and acrylic add derived from a nonfossil raw material are used in combination, the ratio of the nonfossil raw material of the obtained water-absorbing resin can be specified based on $^{14}C$ (radioactive carbon)/C (carbon) of the obtained polyacrylic acid according to U.S. Patent Application Publication No. 2007/219521. The acrylic acid (salt)-based water-absorbing resin obtained from a conventional fossil raw material (particularly, petroleum and further propylene) has $^{14}C/C$ less than $1.0 \times 10^{-14}$, whereas the water-absorbing resin of the present invention has $^{14}C/C$ of preferably $1.0 \times 10^{-14}$ or more, still more preferably $1.0 \times 10^{-13}$ or more, and particularly preferably $1.0 \times 10^{-12}$. In the case where almost 100 mass % is a nonfossil raw material, the upper limit is $1.2 \times 10^{-12}$. The $^{14}C/C$ can be measured by isotope mass spectroscopy and the like and is described in, for example, U.S. Pat. Nos. 3,885,155, 4,427,884, 5,438,194, and 5,661,299.

Additionally, since artificial $^{14}C$ produced by a nuclear test in the atmosphere exists in nature, the concentration of $^{14}C$ is sometimes increased slightly higher than the standard level and pMC becomes a hundred and several % as shown in the above (1-9). The ratio of a nonfossil raw material to a fossil raw material may be calculated by making proper correction. Also, the half-life of $^{14}C$ is 5730 years and in consideration of the period from the production of a common chemical product, particularly a water-absorbing resin, to the distribution to the market, decrease of $^{14}C$ can be neglectable. Additionally, in the present invention, in the case where $^{14}C/C$ is $1.0 \times 10^{-14}$, it can be expressed by replacing it with pMC (percent modem carbon) arbitrarily.

Quantitative analysis of $^{13}C$ and $^{14}C$ can be carried out by burning an intended polyacrylic acid (salt), particularly, a polyacrylic acid (salt)-type water-absorbing resin into $CO_2$ and analyzing $CO_2$ or graphite (C), which is a derivative (reduced product) thereof, by accelerator mass spectrometry method. For example, the amounts of $^{12}C$ ion, $^{13}C$ ion, and $^{14}C$ ion in C ionized by Cs beam irradiation are respectively measured.

The $^{13}C$ and $^{14}C$ volume or the following hydrogen isotope ratio of a polyacrylic acid (salt), particularly, a polyacrylic acid (salt)-type water-absorbing resin may be controlled by using acrylic acid having a prescribed $^{13}C$ and $^{14}C$ volume or the following hydrogen isotope ratio as an acrylic acid raw material. For that, a specified natural product (particularly a nonfossil raw material) described later may be used as a starting material to produce acrylic acid via glycerin, 3-hydroxypropionic acid, and 2-hydroxypropionic acid or via as dean as an intermediate and make the acrylic acid have a prescribed $^{13}C$ or $^{14}C$ volume or the following hydrogen isotope ratio.

In addition, acrylic acid containing $^{13}C$ and $^{14}C$ in a large amount has a higher molecular weight correspondingly (the molecular weight of acrylic acid using $^{12}C$ is 72) so that the boiling point becomes slightly higher (the boiling point of acrylic acid is generally 143° C.). Accordingly, based on the difference of boiling point (the boiling point is lower as the molecular weight is smaller) derived from the mass (molecular weight) ratio, the $^{13}C$ and $^{14}C$ volume can be adjusted. Concretely, acrylic acid having prescribed $^{13}C$ and $^{14}C$ volume can be obtained by aerification at vapor-phase oxidation reaction of a raw material of acrylic acid (glycerin, 3-hydroxypropionic acid, and 2-hydroxypropionic acid) and acrolein, an intermediate or by distillation refining of acrylic acid obtained by the reaction.

However, in the case where the above-mentioned difference of boiling point derived from the above mentioned mass (molecular weight) ratio is very slight, the carbon stable isotope ratio ($\delta^{13}C$) is controlled substantially by using a specified plant raw material and fine adjustment (several ‰) may be carried out by the aerification ratio in the vapor-phase oxidation reaction and distillation refining (a compound with a lower boiling point, in other words, a compound with a lower isotope ratio, is evaporated first).

Also, regarding the hydrogen isotope ratio, the ratio may be similarly changed (especially decreased) based en the difference of boiling point derived from mass (molecular weight) by distillation and the like.

(Hydrogen Isotope Ratio)

In addition to above $^{13}C$ and $^{14}C$, the hydrogen isotope ratio may be adjusted or measured to further improve the traceability. The hydrogen isotope ratio ($\delta D$ vs. SMOW) can be controlled by selecting an acrylic acid raw material in a range of preferably −500 to 0‰, particularly preferably −300 to 0‰, and still more preferably −300 to −15‰ (vs. SMOW Standard Mean Ocean Water). For example, among C3 plants, rice has a hydrogen isotope ratio of around −30‰; wheat around −100 to 70‰; and potato around −100 to −70‰ (vs. SMOW).

Examples of a method for measuring the hydrogen isotope ratio include, mass spectrometry carried out by, for example, converting hydrogen composing a polyacrylic acid (salt)-type water-absorbing resin into hydrogen molecules ($H_2$ or its isotope $D_2$) and then measuring the mass ratio of the gas (H:1, D:2) by using a mass spectrometer for stable isotope ratio measurement. After a polyacrylic acid (salt), particularly, a polyacrylic acid (salt)-type rater absorbing resin is converted into hydrogen gas by a pretreatment, the hydrogen gas is subjected to the measurement with, for example, a WS-CRDS type hydrogen stable isotope ratio analyzer manufactured by PICARRO and the like.

(Impurities of Acrylic Acid with Specified $\delta^{13}C$)

In the case where acrylic acid derived from biomass is used, an aldehyde component and a saturated carboxylic acid (particularly acetic acid or propionic acid) tend to increase and in the case where the acrylic acid is used for a water-absorbing resin, it is preferable to control the contents of these components smaller. As a method for the control, a method for producing acrylic acid, a method for refining acrylic acid, a distillation method, and a crystallization method may be controlled properly and preferably crystallization and further multistage crystallization are performed.

Additionally, as described above, the carbon stable isotope ratio ($\delta^{13}C$) may be changed before and after distillation and refining based on the difference of boiling point derived from the mass (molecular weight) ratio.

From the viewpoint of polymerizability and physical properties of a water absorbing resin to be obtained, preferably one or more, more preferably two or more, still more preferably three or more further still more preferably four or more, particularly preferably five or more, and particularly preferably all six types of impurities among protoanemonin, allyl acrylate, allyl alcohol, an aldehyde component (particularly, furfural), maleic acid, and benzoic acid in the acrylic acid are in an amount of 0 to 20 ppm (on the basis of mass, hereinafter the same) each. It is preferably 0 to 10 ppm, more preferably 0 to 5 ppm, still more preferably 0 to 3 ppm, particularly preferably 0 to 1 ppm, and most preferably ND (non detectable) each. Among these impurities, the aldehyde component is sometimes increased in acrylic acid derived from biomass and it is indispensably preferable to control the aldehyde component. A control method may be use of an aldehyde treatment agent (e.g., hydrazine) or crystallization. Further, the total amount (to the mass of as acid) of these protoanemonin, allyl acrylate, allyl alcohol, aldehyde component, maleic acid, and benzoic acid is preferably 100 ppm or less, more preferably 0 to 20 ppm, still more preferably 0 to 10 ppm, and particularly preferably 0 to 5 ppm. A preferable method for controlling these trace components and propionic acid amount is use of the acrylic acid derived from a nonfossil raw material as described later.

Also, as compared with acrylic acid obtained by a conventional acrylic acid production method, that is, acrylic acid obtained by vapor-phase oxidation of propylene, a fossil raw material, in the case of obtaining acrylic acid from the above-mentioned C4 plant, there may be cases where acrylic acid with a specified C13 to be obtained contains different impurities and trace components and it is necessary to carefully take the effect of these impurities and trace components on a water absorbing resin into consideration. That is, as acrylic acid derived from biomass, in the case of obtaining acrylic acid from the above-mentioned 3-HPA and 2-HPA, 3-HPA and acrylamide may be mixed as their particular impurities and 3-HPA leads to increase of a residual monomer (residual acrylic acid) by heating, and therefore the amount of 3-HPA is preferably 10 ppm or less, still morn preferably 1 ppm or less, and particularly preferably 0.1 ppm or less. Also, from the viewpoint of safety, the amount of acrylamide is preferably 10 ppm or less, still more preferably 1 ppm or less, and particularly preferably 0.1 ppm or less. For achieving this amount, distillation or crystallization may be carried out until these impurities are decreased. Further, in the case where acrylic acid derived from biomass is used, (mono- or di-)hydroxyacetone may be mixed and the stability of a monomer may be deteriorated. Therefore, their amount is also preferably 10 ppm or leas (the lower limit is 0 ppm), more preferably 1 ppm or less (the lower limit is 0 ppm), and particularly preferably 0.1 ppm or less (the lower limit is 0 ppm).

From the viewpoint of suppression of malodor, the amount of a saturated carboxylic acid (particularly, acetic acid of propionic acid) in the acrylic add is controlled to be preferably 1 mass % or less, more preferably 0.5 mass % or less, and still mere preferably 0.3 mass % or less. In order to improve the water absorption rate (CRC), it is effective to add a saturated carboxylic acid (particularly propionic acid) at the time of polymerization in an amount of preferably 0.01 mass % or more, more preferably 0.03 mass % or more, still more preferably 0.05 mass % or more, and particularly preferably 0.1 mass % or more. That is, it was found that propionic acid in acrylic acid can improve the water absorption rate (CRC) of a water-absorbing resin after polymerization and addition of a specified amount at the time of polymerization is preferable.

Further, it is supposed that a water-absorbing resin and acrylic acid of the present invention contain 3-HPA as impurities, and from the viewpoint of reduction of the residual monomers of the water-absorbing resin and reduction of water soluble components, the content of 3-HPA in the water-absorbing resin is 5000 ppm or less, preferably 3500 ppm or less, and more preferably 2000 ppm or less and particularly in the range described in (3-9) Trace components described later. Also, it is better as the content of 3-HPA is smaller and the lower limit is not particularly limited. On the other hand, if the content of 3-HPA exceeds 5000 ppm, the residual monomer amount of a water absorbing resin to be obtained is increased and therefore, it is not preferable. Additionally, it is better as the lower limit is smaller and it is more preferably 0 ppm (ND/Non-Detectable), but in terms of the balance of cost effectiveness such as refining cost, the lower limit is sufficiently 10 ppm and more preferably 50 ppm.

(Use of a Plurality of Acrylic Acids)

In the present invention, it is also preferable to obtain a water-soluble unsaturated monomer by mixing acrylic acid with different carbon stable isotope ratios ($\delta^{13}C$) within the range of the intended carbon stable isotope ratio ($\delta^{13}C$). In other words, to conveniently and economically obtain a monomer or acrylic acid containing a prescribed trace component (particularly, propionic acid) other than the above-mentioned acrylic acid with $^{13}C$, it is preferable to produce a monomer by mixing a plurality of acrylic acids produced by different production methods (hereinafter referred to as a plurality of acrylic acids). Also, it is preferable to further improve the traceability of a water absorbing resin to be obtained which is provided with a more specified carbon stable isotope ratio ($\delta^{13}C$) not only by obtaining acrylic acid with a specified carbon stable isotope ratio ($\delta^{13}C$) from a raw material derived from a C4 plant but also by adjusting the carbon stable isotope ratio ($\delta^{13}C$) to be the specified value by mixing acrylic acids with different carbon stable isotope ratios ($\delta^{13}C$) and thereby providing the specified carbon stable isotope ratio ($\delta^{13}C$), that is, a carbon stable isotope ratio ($\delta^{13}C$) which a C4 plant alone cannot give. That is, if raw materials with different carbon stable isotope ratios ($\delta^{13}C$) are used, the statistic analysis value obtained by analyzing their carbon stable isotope ratios becomes a particular value and the raw materials can be distinguished from other raw materials. Accordingly, the carbon stable isotope ratio of a water-absorbing resin produced from such raw materials shows a particular analysis value and identification and tracing are made easy.

Additionally, in the ease where a plurality of acrylic acids having different carbon stable isotope ratios ($\delta^{13}C$) are mixed and used, the acrylic acids may be mixed at the stage of refined acrylic acid as a final product or may be mixed in form of crude acrylic acids at a stage prior to the above stage and then refined (distillation, crystallization, or a combination of these) or acrylic acid to be mixed may be acrylic acid obtained by mixing a different type of acrolein in the vapor-phase oxidation stage and thereafter oxidizing the acrolein mixture.

Especially, from the viewpoint of adjustment of the trace components and risk hedge of raw materials and also from the viewpoint of further improvement of traceability of a water absorbing resin to be obtained, it is preferable to employ a method of using a plurality of raw material sources of a fossil raw material and a nonfossil raw material as the above-mentioned acrylic acid. The mixing ratio in the above-mentioned production method may be constant or changed over time and/or by each water-absorbing resin in the above-mentioned production method using a plurality of acrylic acids, since the purity of the monomer (trace components) can be controlled to be constant without excess refining of acrylic acid, the acrylic acid can be used economically and at high yield and a water-absorbing resin with good physical properties can be economically and stably obtained. Since acrylic acid is neither completely derived from a fossil raw material nor completely derived from a nonfossil raw material, an obtained water-absorbing resin has a particular and specified $^{14}C$ ratio and is provided with further improved traceability and therefore, it is preferable. The ratio of a nonfossil raw material to a fossil raw material can be specified by quantitatively measuring the a $^{14}C$ ratio of an obtained polyacrylic acid-type water absorbing resin.

Also, use of a plurality of raw material sources of a fossil raw material and a nonfossil raw material for acrylic acid can hedge the raw material cost of a water-absorbing resin. Such a novel water-absorbing resin is excellent in the cost and the stability of raw material sources and easy to contain the trace components such as propionic acid at the optimum ratio and therefore prodded with stable physical properties and widely usable as an economical water-absorbing resin with good physical properties. Hydroxypropionic acid and glycerin are used as the nonfossil raw material of acrylic acid, and petroleum and coal are used as the fossil raw material.

Also, it is preferable to change the carbon stable isotope ratio ($\delta^{13}C$) of acrylic acid in the polymerization step depending on any of the production line, production time, and a product lot number, particularly the production time. That is, since the cost of glycerin, a nonfossil raw material, significantly depends cm the costs of its raw material C4 plant and raw material C3 plant as compared with the cost of propylene derived from petroleum which is a fossil raw material, the raw material cost can be stabilized by changing the use ratio of the raw material C4 plant and the raw material C3 plant corresponding to their costs.

Different carbon sources may be used for acrylic acids with different carbon stable isotope ratios ($\delta^{13}C$) and preferably, acrylic acids derived from a fossil raw material and a nonfossil raw material are used and other than the raw materials, a plant (process) and the location may be completely different; an oxidation system (particularly a catalyst) and a refining system (distillation and crystallization) may be different and depending on these factors, impurities, particularly, the propionic acid amount, is preferably made different. In the case where two kinds of acrylic acids are used, the use ratio (mass ratio) is determined properly and it is generally in the range of 1:99 to 99:1. The ratio is preferably 10:90 to 90:10, more preferably 20:80 to 80:20, and particularly preferably 30:70 to 70:30. Additionally, acrylic acids other than the two types mentioned before may be used in an amount in the range of 0 to 50 mass % in the total amount of acrylic acids, more preferably 0 to 30 mass %, and still more preferably 0 to 10 mass %, The use ratio of two or more different types of acrylic acids is determined properly on the basis of the costs (raw material costs) of acrylic acids, supply amounts, trace components (propionic acid and other trace components), and the like and particularly, use of a plurality (particularly two types) draw material sources of a fossil raw material and a nonfossil raw material can hedge the raw material cost of a water-absorbing resin. Additionally, in the case where the fossil raw material and the nonfossil raw material are used in combination, the ratio can be measured by quantitatively measuring $^{14}C$ in monomers and a water-absorbing resin.

In this case, at least acrylic acid derived from a nonfossil raw material is used, and a plurality of acrylic acids are used and one acrylic acid is obtained from a nonfossil raw material and the other is obtained from a fossil raw material (FIG. 1). In general, acrylic add derived from a nonfossil raw material contains much propionic acid or the like and therefore, it can be used preferably. Further, also in terms of adjustment or stabilization of other trace components, not only propionic acid (even if propionic add is in the same level), a plurality of acrylic acids, particularly acrylic add from a fossil raw material and acrylic acid from a nonfossil raw material, are used in combination. As another effect of the present invention, use of a plurality of raw material sources of a fossil raw material and a nonfossil raw material for acrylic acid reduces the raw material cost of a water-absorbing resin, and a water-absorbing resin which is optimum also in view of the raw material cost can be obtained. That is, preferably, acrylic acid derived from a fossil raw material and acrylic acid derived from a nonfossil raw material are used in combination as described later.

Hereinafter, propionic acid is explained as a representative trace component; however, it is preferable to prepare an intended monomer by using a plurality of acrylic acids containing different amounts of propionic acid in terms of the cost and processes in order to adjust the propionic acid amount in the acrylic acid. That is, a plurality of acrylic acids containing different amounts of propionic acid are produced in different acrylic acid production processes.

Herein, with respect to acrylic adds containing different amounts of propionic acid, one acrylic acid contains propionic add preferably 1.01 to 1000 times by mass with respect to the other acrylic add, more preferably 1.05 to 100 times by mass, and still more preferably 1.1 to 50 times by mass.

Concretely, at least one acrylic acid preferably contains 400 ppm or more of propionic acid.

Also, in order to make identification and/or tracing of a water-absorbing resin easy, the present invention also provides a method for producing a water-absorbing resin, which is a method for producing a polyacrylic acid (salt)-type water-absorbing resin involving a polymerization step for a water-soluble unsaturated monomer and a drying step for the obtained water-containing gel-like crosslinked polymer and which changes the carbon stable isotope ratio ($\delta^{13}C$) of acrylic acid. The variation width of the stable isotope ratio is 1‰ or more, further 5‰ or more, and particularly 10‰ or more. The upper limit of the variation width is properly determined and in terms of the production cost of different acrylic acids, it is preferably 100‰ or less, more preferably 50‰ or less, and still more preferably 30‰ or less.

(Acrylic Acid Production Process and Water-Absorbing Resin Production Process)

The above-mentioned acrylic acid production process and water-absorbing resin production process are preferably made close to each other, more preferably joined. In the case where acrylic acid is obtained from glycerin derived from fats and oils, fatty acid derivatives (e.g., biodiesel) and glycerin may be simultaneously obtained from fats and oils and further acrylic acid and furthermore a water-absorbing resin may be obtained, and these steps are also preferably made close to each other, more preferably directly joined. Also, from the viewpoint of decreasing $CO_2$, acrylic acid and further a water-absorbing resin are preferably produced near the above-mentioned specified $^{13}C$ plant raw material and from the viewpoint of saving energy for transportation, acrylic acid is produced and polymerized in a way of "local production for local consumption" regarding the above-mentioned specified $^{13}C$ plant raw material.

Therefore, acrylic acid may be obtained near the specified $^{13}C$ plant raw material, particularly within 1000 km, further within 500 km, and particularly within 100 km and a water absorbing resin may be obtained near the site, particularly within 1000 km, further within 500 km, particularly within 100 km, within 10 km, and within 1 km. Shortening their transportation distance reduces $CO_2$ emitted by transportation and also decreases acrylic acid chimers, which are a cause of residual monomers and therefore, it is preferable.

(Polymerization Inhibitor)

In terms of stability and speed of polymerization, monomers using acrylic acid preferably contain a prescribed amount of a polymerization inhibitor, and the amount is more preferably more than 0 and 200 ppm or less, still more preferably 1 to 160 ppm, particularly preferably 10 to 100 ppm, and further still more preferably 15 to 80 ppm. A polymerization inhibitor to be added preferably contains methoxyphenols and particularly p-methoxyphenol. A large quantity of a polymerization inhibitor causes problems of reduction of polymerization speed and coloration after production, but if the quantity it is too small, not only stability of monomers is adversely affected but also polymerization is sometimes made rather slow. Also, addition of a prescribed amount is sometimes preferable from the viewpoint of traceability and weathering resistance of gel.

The polymerization inhibitor is contained in a prescribed amount in monomers such as acrylic acid, and a portion of the polymerization inhibitor is consumed in the process (particularly in the polymerization step) for producing a polyacrylic acid (salt) and particularly a polyacrylic acid (salt)-type water-absorbing resin and some remains in the polyacrylic acid (salt) and particularly the polyacrylic acid (salt)-type water-absorbing resin.

The remaining amount of the polymerization inhibitor, that is, the content in the polyacrylic and (salt) and particularly the polyacrylic acid (salt)-type water-absorbing resin may be determined properly on the basis of the polymerization time, polymerization initiator amount, drying temperature and the like, and as content of p-methoxyphenol, it is preferably 5 to 60 ppm, more preferably 6 to 40 ppm, still more preferably 8 to 30 ppm, and particularly preferably 8 to 20 ppm. Concretely, a method for controlling the remaining amount of a polymerization inhibitor may involve polymerizing monomers using acrylic acid and containing the polymerization inhibitor in the above-mentioned range, drying the obtained water-containing crosslinked polymer at a drying temperature described later of 150 to 250° C. for a drying time of 10 to 120 minutes to lower the water content rate to 20 mass % or less, mixing 0.001 to 10 parts by mass ore surface-crosslinking agent to 100 parts by mass of the dried water-absorbing resin powder, and carrying out a heating treatment at 70 to 300° C. for 1 to 120 minutes. The quantitative analysis of the trace components such as p-methoxyphenol may be carried out by extracting them with a large excess amount of water or saline, carrying out a treatment such as concentration of the filtrate if necessary, and then measuring their concentration in the filtrate by liquid chromatography or the like.

Additionally, use of methoxyphenols is not disclosed in Example 2 of U.S. Patent Application Publication No. 2007/0219521 and in the case where these compounds are not used, it sometimes results in fluctuation of physical properties and decrease of traceability.

(2-2) Polymerization Step

This step is a step of obtaining a water-containing gel-like polymer, in particular, a water containing gel-like crosslinked polymer (herein after, called as "hydrogel") by polymerizing an aqueous solution containing acrylic acid (salt) as a main components obtained by the above mentioned (2-1) acrylic acid production step.

(Monomer)

A polyacrylic acid (salt), in particular, a polyacrylic acid (salt)-type water-absorbing resin to be obtained by the present invention is produced by using, as a raw material (monomer), an aqueous solution containing acrylic acid (salt) as a main component and generally polymerized in aqueous solution state. The monomer concentration of the aqueous monomer solution is generally 10 to 90 mass % and preferably 20 to 80 mass %, more preferably 30 to 70 mass %, still more preferably 40 to 60 mass %.

Also, a hydrogel obtained by the aqueous solution polymerization preferably has at least partially neutralized acid groups in the polymer from the view point of water absorption performance. The neutralization may be carried out before polymerization, during polymerization, or after polymerization of acrylic acid and in terms of improvement of the productivity of the water absorbing resin, AAP (water absorption capacity under load), SFC (saline new conductivity), and the like, it is preferable to carry out neutralization before polymerization of acrylic acid. That is, it is preferable to use neutralized acrylic acid (that is, a partially neutralized salt of acrylic acid) as a monomer.

Above neutralization ratio of the neutralization is not particularly limited but it is preferably 10 to 100 mol %, more preferably 30 to 95 mol %, still more preferably 50 to 90 mol %, and particularly preferably 60 to 80 mol % of the acid group. In the case the neutralization ratio is less than 10 mol %, particularly CRC (water absorption capacity without load) is sometimes considerably lowered and therefore, it is not preferable. Additionally, the neutralization ratio is arbitrarily selected from above range for water soluble polyacrylic acid (salt).

Also, in the case of the acrylic acid (salt) is used as a main component in the present invention, hydrophilic or hydrophobic unsaturated monomers (hereinafter, sometimes also referred to as "other monomers") may be used besides an acrylic acid (salt). The other monomers is not particularly limited and may include methacrylic acid, maleic acid, maleic anhydride, 2-(meth)acrylamido-2-methylpropanesulfonic acid, (methlacryloxyalkanesulfonic acid, N-vinyl-2-pyrrolidene, N-vinylacetamide, (meth)acrylamide, N-isopropyl(methacrylamide, N,N-dimethyl(meth)acrylamide, 2-hydroxyethyl (meth)acrylate, methoxypolyethylene glycol (methacrylate, polyethylene glycol (meth)acrylate, stearyl acrylate, their salts, and the like. In the case of these other monomers are used, their use amount is not particularly limited as long as the water absorption property of the water-absorbing resin to be obtained is not deteriorated and it is preferably 50 mass % or lower and more preferably 20 mass % or lower relative to the total weight of the monomers.

(Salt for Neutralization)

A basic substance to be used for neutralizing acrylic acid as above mentioned monomer or polymer (hydrogel) after the polymerization is not particularly limited and is preferably monovalent basic substances, for example, alkali metal hydroxides ouch as sodium hydroxide, potassium hydroxide, and lithium hydroxide and the like, and (hydrogen) carbonate salts such as sodium (hydrogen) carbonate and potassium (hydrogen) carbonate and the like, and is particularly preferably sodium hydroxide. Also, the temperature at the time of neutralization (neutralization temperature) is also not particularly limited and preferably 10 to 100° C. and more preferably 30 to 90° C. Additionally, regarding the neutralization treatment conditions and the like other than the above-mentioned ones, the conditions disclosed in International Publication No. 2006/522181 and the like are preferably employed in the present invention. Salt for neutralization (NaOH) and the like preferably contains less than predetermined amount of Fe in the rage mentioned below.

(Trace Components in Monomers)

Acrylic acid contains trace components in the above-mentioned range and contains a polymerization inhibitor in the above-mentioned range. From the viewpoint of suppression of coloration and deterioration of a water-absorbing resin, the amount of iron mainly derived from the above-mentioned neutral salt (on the basis of $Fe_2O_3$) is preferably 0 to 5 ppm, still more preferably 0 to 2 ppm, particularly preferably 0 to 1 ppm, and the lower limit is a small content due to the polymerization speed and preferably 0.01 ppm or more and still more preferably 0.02 ppm or more. In addition to the above-mentioned 3-HPA in acrylic acid, particularly acrylic acid derived from 3-HPA, the acrylic add dimer (oligomer) and 3-HPA produced as byproducts alter acrylic acid production are also more preferable as they are smaller in the amount from the viewpoint of residual monomers, and the amount of them in the monomer is preferably 1000 ppm or less, still more preferably 500 ppm or less, more preferably 300 ppm or less, and particularly preferably 100 ppm or less.

That is, because of the above-mentioned reason, preferably one or more, still more preferably two or more, more preferably three or more, and particularly preferably four of the following water-soluble unsaturated monomers preferably simultaneously satisfy the content described below in the present invention. A more preferable content is in the above-mentioned range.

The content of 3-hydroxypropionic acid is 1000 ppm or less
The content of a polymerization initiator is 1 to 160 ppm
The Fe content is 0 to 2 ppm
The content of mono- or di-hydroxyacetone is 0 to 10 ppm or less (Inner Crosslinking Agent)

In the present invention, from the viewpoint of water-absorbing properties of water absorbing resin to be obtained, use of a crosslinking agent (hereinafter may be called as "inner crosslinking agent") is particularly preferable when an intended polyacrylic acid (salt) is polyacrylic acid (salt)-type water-absorbing resin. Examples usable as the inner crosslinking agent are, not specifically limited, polymerizable crosslinking agents with acrylic acid, reactive crosslinking agents with a carboxyl group, and crosslinking agents having both of these properties and the like. In particular, as the polymerizable crosslinking agent, compounds having at least two polymerizable double bonds in a molecule such as N,N'-methylenebisacrylaimde, (poly)ethylene glycol di(meth)acrylate, (polyoxyethylene)trimethylolpropane tri(meth)acrylate and poly(meth)allyloxyalkanes are exemplified. Also, examples of the reactive crosslinking agent are covalent-binding crosslinking agents such as polyglycidyl ether such as ethylene glycol diglycidyl ether, poly alcohols such as propanediol, glycerin and sorbitol, and ion-binding crosslinking agents such as polyvalent metal compounds of aluminum salt. Among them, from the view point of water absorbing properties, the polymerizable crosslinking agents with acrylic acid is preferably used, particularly, acrylate type, allyl type, and acrylamide type polymerizable crosslinking agents are preferably used. These inner crosslinking agents can be used alone or two or more thereof in combination. The inner crosslinking agent is used in an amount of preferably 0.001 to 5% by mole, more preferably 0.005 to 2% by mole, still more preferably 0.01 to 1% by mole, and particularly preferably 0.03 to 0.5% by mole relative to the above mentioned monomer excluding the crosslinking agent, from the view point of physical properties aspect.

Therefore, water-absorbing resign having high physical properties can not be obtained by unbridged material (inner crosslinking agents are not used) exemplified in Patent Document 5, accordingly, a water-containing gel-like crosslinked polymer is to be used necessarily in the present invention.

(Other Monomer Components in the Aqueous Monomer Solution)

To improve the various physical properties of the water-absorbing resin to be obtained of the present invention, as optional ingredients, following materials can be added to the above-mentioned aqueous monomer solution. That is, water-soluble resin or water-absorbing resin such as starch, polyacrylic acid (salt), polyvinyl alcohol, or polyethylene imine in an amount of, for example, 0 to 50 mass %, preferably 0 to 20 mass %, more preferably 0 to 10 mass %, still more preferably 0 to 3 mass %, and particularly 0 to 1 mass % relative to the monomer can be added. Furthermore, a various kinds of foaming agents (carbonates, azo compounds, air bubbles and the like), surfactants, various kinds of chelating agent, hydroxycarboxylic acid or reducing inorganic salt and the like can be added in an amount of, for example, 0 to 5 mass %, preferably 0 to 1 mass % relative to the monomer.

Additionally, the polyacrylic acid (salt) of the present invention contains acrylic acid with a specified ratio of $^{13}C/^{14}C$ as a main component and a small amount of a natural graft component (e.g., starch) may be used. In the case where a significant amount of the natural graft component is not contained, or the amount is preferably 0 to 2 mass % and more preferably 0 to 1 mass %, the $^{13}C/^{14}C$ of the polyacrylate acid (salt) is determined substantially on the baths of the $^{13}C/^{14}C$ of acrylic acid.

Among them, in the case of aiming at suppression of color hue with the lapse of time and improvement of urine resistance (gel deterioration prevention) of the water-absorbing resin, a chelating agent, as hydroxycarboxylic acid, and a reducing inorganic salt are preferably used and the chelating agent is particularly preferably used. The use amount in this case is preferably 10 to 5000 ppm, more preferably 10 to 1000 ppm, still more preferably 50 to 1000 ppm, and particularly preferably 100 to 1000 ppm relative to the water-absorbing resin. Additionally, the compounds disclosed in international Publication No. 2009/005114 and EP Patent Nos. 2057228 and 1848758 may be used for the chelating agent, hydroxycarboxylic acid, and reducing inorganic salt.

(Polymerization Initiator)

A polymerization initiator to be used for the present invention is not specifically limited and can be selected properly in accordance with the polymerization mode. Examples may include a heat decomposition type polymerization initiator, a photodecomposition type polymerization initiator, and a redox type polymerization initiator and the like. In particular, examples of the heat decomposition type polymerization initiator may include persulfate such as sodium persulfate, potassium persulfate, and ammonium persulfate, peroxides such as hydrogen peroxide, tort-butyl peroxide, methyl ethyl ketone peroxide, azo compounds such as 2,2'-azobis(2-amindinopropane) dihydrochloride, 2,2'-azobis[2-(2-imidazolin-2-yl)propane]dihydrochloride, and the like. Further, examples of the photodecomposition type polymerization initiator may include benzoin derivatives, benzyl derivatives, acetophenone derivatives, benzophenone derivatives, and azo compounds and the like. Further, examples of the redox type polymerization initiator may include the above-mentioned persulfate or peroxides in combination with reducing compounds such as L-ascorbic acid and sodium hydrogen sulfite. Combination use of the photodecomposition type initiator and the heat decomposition type polymerization initiator can also be exemplified as a preferable embodiment. The amount of these polymerization initiators may be preferably 0.0001 to 1% by mole and more preferably 0.001 to 0.5% by mole relative to the above mentioned monomer. In the case of the amount of the polymerization initiator is more than 1% by mole, coloring of water-absorbing resin may possibly generate which is not preferable and in the case of the amount is lower than 0.0001% by mole, it results in increase of the residual monomer which is not preferable.

Additionally, polymerization reaction may be canned out by irradiating with active energy rays such as radioactive rays, electron rays, and ultraviolet rays, instead of using above mentioned polymerization initiator. And these active energy rays may be used in combination with a polymerization initiator.

(Polymerization Method)

In the present invention, from the view point of water-absorbing performance of obtained water-absorbing, resin, the easiness of polymerization control and the like, the polymerization method may be carried out by aqueous solution polymerization or reverse phase suspension polymerization in general, but it is preferably carried out by aqueous solution polymerization and more preferably carried out by continuous aqueous solution polymerization when polymerizing the above mentioned aqueous monomer solution. Among them, polymerization method is preferably applicable to production apparatus used in a huge scale of production amount per one line in the water-absorbing resin. The production amount is preferably 0.5 [t/hr] or higher, more preferably 1 [t/hr] or higher, still more preferably 5 [t/hr] or higher, and particularly preferably 10 [t/hr] or higher. Also, as the preferred embodiment of the above mentioned aqueous solution polymerization, continuous belt polymerization (disclosed in U.S. Pat. Nos. 4,893,999 and 6,241,928, and US Patent Application Publication No. 2005/215734 and the like), continuous kneader polymerization and batch kneader polymerization (disclosed in U.S. Pat. Nos. 6,987,151 and 6,710,141 and the like) and the like can be exemplified. Among them, continuous belt polymerization is particularly preferably.

In the above continuous aqueous solution polymerization, polymerization at a temperature starting at preferably 30° C. or higher, more preferably 35° C. or higher, still more preferably 40° C. or higher, and particularly preferably 50° C. or higher (the upper limit is the boiling point) in the polymerization at a high temperature starting or a monomer concentration, preferably 35 mass % or higher, more preferably 40 mass % or higher, and still more preferably 45 mass % or higher (the upper limit is the saturated concentration) in the polymerization at a high monomer concentration, can be exemplified as a most preferable example. Additionally, the above mentioned polymerization starting temperature is specified by liquid temperature of aqueous monomer solution just before supplying to polymerization apparatus but, conditions described in U.S. Pat. Nos. 6,906,150, 7,091,253 and the like can be preferably employed in the present invention.

Further, in the present invention, from the view point of improving the physical properties of obtained water-absorbing resin and drying efficiency, it is preferable to evaporate water when polymerization. That is, in the polymerization of the present invention, it is only necessary to obtain hydrogel having more high solid content and elevation degree of solid content ("solid content of hydrogel after polymerization"—"monomer concentration before polymerization") is preferably 1 mass % or more, more preferably 2 to 40 mass %, and still more preferably 3 to 30 mass %. However, solid content of thus obtained hydrogel is preferably 80 mass % or lower.

Also, the polymerization can be carried out in atmospheric air. However, it is preferable, from the view point of preventing coloring, to carry out the polymerization in an inert gas atmosphere of nitrogen or argon and the like (e.g., oxygen concentration is less than 1 mg/L). And also, it is preferable to be used for polymerization alter the dissolved oxygen in the monomer or the solution containing the monomer is sufficiently replaced with an inert gas (e.g., dissolved oxygen concentration: less than 1 mg/L). Also, the polymerization can be carried out under any pressure of reduced, normal, or pressurized pressure.

(2-3) Gel-Crushing Step

This step is the step for obtaining hydrogel in particle state (herein after called as "particulated hydrogel") by gel-crushing hydrogel obtained by the above mentioned polymerization step.

The hydrogel obtained by the above mentioned polymerization step may be dried as it is, however to solve the problems, hydrogel is gel-crushed to be particulate preferably during polymerization or after polymerization with a gel-crasher as needed (kneader, meat chopper, cuter mill or the like). That is, the gel particulated step (herein after may be called as "gel-crushing") may be included between polymerization step of the continuous belt polymerization or the continuous kneader polymerization and a drying step. Additionally, even in the case the gel is finely particulated by dispersion in a solvent at the time of polymerization such as reverse-phase suspension polymerization, the finely particulate step (finely particulate during polymerization) is included in the present invention and gel-crushing is preferably carried out using a gel-crusher.

From the physical properties aspect, regarding the temperature or the hydrogel at the time of gel-crushing, the hydrogel is kept or heated preferably at 40 to 95° C. and more preferably 50 to 80° C. The resin solid content of the particulated hydrogel at the time of gel-crushing or after gel-crushed is not particularly limited; however, from the physical properties aspect, it is preferably 55 to 80 mass %. Additionally, in the gel-crushing step, it is optional to add water, polyhydric alcohol, mixed liquid of water and polyhydric alcohol, solution obtained by dissolving a polyvalent metal in water, or their vapor, and the like, if needed, to improve the gel-crushing efficiency. Also, when gel-crushing the hydrogel having high solid content concentration ("for example, 55 to 80 mass % as mentioned above) which can be preferably applicable to the present invention, ventilation, preferably circulation of dried air may be employed in gel-crushing apparatus.

The mass average particle diameter (D50) of the particulated hydrogel after gel-crushing is preferably 0.2 to 4 mm, more preferably 0.3 to 3 mm, and still more preferably 0.5 to 2 mm from the viewpoint of controlling the percentage of dropping and scattering at a low level. Control of the mass average particle diameter (D50) of the particulated hydrogel in the above-mentioned range is preferable since drying is carried out efficiently. The ratio of particulated hydrogel having a particle diameter of 5 mm or larger is preferably 0 to 10 mass % and more preferably 0 to 5 mass % in the entire particulated hydrogel.

Additionally, the above-mentioned particle diameter of the panic dated hydrogel can be measured by classification with a sieve with a specified mesh size, similarly to the particle diameter of a water-absorbing resin after the pulverizing step. Also, the mass average particle diameter (D50) can be measured similarly. However, if the classification operation of the particulated hydrogel is difficult by a dry classification method because of agglomeration or the like to make the measurement difficult, the measurement is carried out by a wet classification method as described in JP-A-2000-63527 in paragraph [0091].

(2-4) Drying Step

Drying methods is not specifically limited unless the water-containing gel-like crosslinked polymer obtained by the above mentioned polymerization step or the crushed-gel obtained by crushing step can be dried at a level of predetermined resin solid content, A various drying methods such as heat drying, hot-air drying, vacuum drying, fluid bed drying, infrared ray dying, microwave drying, drying by a drum drier, drying using azeotropic dehydration with a hydrophobic organic solvent, high humidity drying using high temperature steam can be employed.

Among them, hot-air drying is preferable and it is more preferably hot-air drying with a gas with a dew point of 40 to 100° C. and still more preferably hot-air drying with a gas with a dew point of 50 to 90° C., When using hot-air drying, wind speed (velocity of air current passing through vertically against object to be dried range on horizon) is preferably 0.01 to 10 [m/s] and more preferably 0.1 to 5 [m/s].

The drying temperature to be employed is not particularly limited in the present invention, however, it is preferably 50 to 300° C. (drying is preferably conducted under reduced pressure if the drying temperature is 100° C. or lower), more preferably 100 to 250° C., still more preferably 150 to 200° C. Also, the drying rime is preferably 10 to 120 minutes, mare preferably 20 to 90 minutes, still more preferably 30 to 60 minutes. In the case where the drying time is shorter than 10 minutes, it is supposed that the change occurring in the polymer chains in the water-absorbing resin is slight and no sufficient improvement effect can be caused, so that the effect of improving various physical properties may not be caused in some cases. On the other hand, if the drying time is 120 minutes or longer, the water-absorbing resin is damaged and the water soluble components are increased, so that the effect of improving various physical properties may not be caused in some cases.

Further, to satisfy both of the physical properties and whiteness of thus obtained particulated water absorbent agent, the drying temperature is within 165 to 230° C., and drying time is preferably within 50 minutes, and more preferably 20 to 40 minutes. If the temperature or the time is out of the above-mentioned range, it may possibly result in decrease of CRC (the water absorption capacity without load), increase of soluble components, and deterioration of whiteness index in the particulated water-absorbent agent.

Also, a resin solid content, which is calculated from a drying loss of the water-containing gel-like crosslinked polymer or crushed-gel (amount of change when heating of 1 g water absorbing resin at 180° C. for 3 hours) in an amount controlled to be preferably 80 mass % or higher, more preferably 85 to 99 mass %, still more preferably 90 to 98 mass %, and particularly preferably 92 to 97 mass %. In the drying step, dried polymer having controlled its resin solid content above can be obtained.

Further more, in order to accomplish a decrease in residual monomers of particulated water-absorbent agent to be obtained, prevention of gel deterioration (urea resistance improvement), and prevention of yellowing, the time until the start of drying after polymerization is preferable as it is shorter. That is, regardless of above mentioned gel-crashing step is employed or not, it is preferable that the time until the start of drying after polymerization is within 1 hour, more preferably within 0.5 hours, and still more preferably within 0.1 hours. Also, during this term, the temperature of the water-containing gel-like crosslinked polymer or crushed-gel is preferably controlled 50 to 80° C., and more preferably 60 to 70° C. By controlling the temperature within this range, it can be attained to decrease the residual monomer and accomplish low coloring.

(2-5) Pulverization Step, Classification Step

This step is the step to obtain a water-absorbing resin by pulverizing, classifying the dried material obtained by the above mentioned drying step.

In this step, dried material, as it is, obtained by the above mentioned drying step can be used as dried powder, however, it is preferable to adjusting its particle size to the specified particle size to improve the physical properties by surface-crosslinking step described below. Additionally, the particle size can be adjusted properly by not only this pulverization step or classification step, but also polymerization step (particularly reversed phase suspension polymerization), fine powder recovery step, granulation step, and the like. Hereinafter, the particle size is defined by a standard sieve (JIS Z8001-1 (2000)). It is preferable to install classification step before surface-crosslinking step, and it is still more preferable to install classification steps (first classification step and second classification step) both before the surface-crosslinking step and after the surface-crosslinking step.

The apparatus to be used in the pulverization step is not particularly limited and a conventionally known pulverizing apparatus can be used. Specific examples thereof include a roll mill, a hammer mill, a roll granulator, a jaw crusher, a gyratory crusher, a cone crusher, a roll crusher, and a cutter mill and the like. From the viewpoint of particle size control, among them, it is preferable to use a roll mill or a roll granulator in multistage.

Also, in the classification step, various kinds of classification apparatuses such as sieving classification and air current classification can be used.

From the viewpoint of improvement of the physical properties of the water-absorbing resin to be obtained by this step, as an end product, it is preferable to control the particle size as follow, further more before its surface-crosslinking. That is, the mass average particle diameter (D50) of the water-absorbing resin before surface-crosslinking is preferably 200 to 600 μm, more preferably 200 to 550 μm, still more preferably 250 to 500 μm, and particularly preferably 350 to 450 μm. Also, it is better that the ratio of fine particles which pass through a sieve (JIS standard sieve) with meshes of 150 μm are preferably 0 to 5 mass %, more preferably 0 to 3 mass %, and still more preferably 0 to 1 mass % relative to the entire water-absorbing resin. Also, it is better that the ratio of huge particles which does not pass through a sieve (JIS standard sieve) with meshes of 850 μm are preferably 0 to 5 mass %, more preferably 0 to 3 mass %, and still more preferably 0 to 1 mass % relative to the entire water-absorbing resin. Further, the logarithmic standard deviation ($\sigma\xi$) of the particle size distribution of the water-absorbing resin is preferably 0.20 to 0.40, more preferably 0.25 to 0.37, and still more preferably 0.25 to 0.35. The particle size is measured according to the method disclosed in EP Patent No. 0349240 or EDANA-ERT 420.2-02 (Particle Size Distribution). The improvement of physical properties by surface-crosslinking is further exerted with the above mentioned particle size. Also, the particle size is applied to the end product after surface-crosslinking and the like. It can be controlled by classification or granulation after surface-crosslinking if needed.

In general if the particle size distribution is narrowed, that is, the upper and lower limits of the particle sire are controlled to be narrow, the color of water-absorbing resin becomes noticeable when color hue is measured. However, the present invention is free from such color issue and is preferable. Accordingly, the particle sire distribution of water-absorbing resin to be obtained in the present invention has the ratio of particles diameter with 150 to 850 μm of 95 mass % or more, preferably 98 mass % or more (The upper limit is 100 mass %). Additionally, particle size adjustment conducted by meshes 20 to 270 mesh (equivalent with 850 to 53 μm) is disclosed in example 2 of US Patent Application Publication No. 2007/0219521. However, this particle size may be resulted in not only decrease in liquid permeability but also degrade its traceability, deviate its physical properties due to its segregation caused by broadened particle size distribution (2-6) Surface-Crosslinking Step This step is a step for crosslinking (surface-crosslinking reaction) the periphery of the surface of a water-absorbing resin obtained by the pulverizing step and the classification step by using a surface-crosslinking agent to improve water absorption performance. This surface-crosslinking treatment gives a water-absorbing resin with little colorization and high whiteness and is preferably employed for a water-absorbing resin particularly in high temperature surface-crosslinking. Furthermore, in the case where a water absorbing resin obtained in the present invention is used as a raw material for sanitary materials (particularly disposable diapers), it is recommended that AAP (absorption against pressure) is preferably increased to 20 [g/g] or more by this surface-crosslinking treatment.

Examples of a surface-crosslinking agent to be employed in the present invention, not sped ally limited, may include various organic or inorganic crosslinking agents; organic surface crosslinking agents are preferably used and organic surface-crosslinking agent and ion crosslinking agent is more preferably used in combination. Preferable examples to be used as the surface-agent are polyhydric alcohol compounds, epoxy compounds, polyamine compounds or their condensation products with haloepoxy compounds, oxazoline compounds, (mono-, di-, or poly-) oxazolidinone compounds, and alkylene carbonate compounds. Particularly dehydration ester reactive crosslinking agents containing polyalcohol compounds, alkylene carbonate compounds, and oxazolidinone compounds, which require a high temperature reaction, are usable and particularly polyhydric alcohol compounds are usable. More concretely, examples are compounds exemplified in U.S. Pat. Nos. 6,228,930, 6,071,976, and 6,254,990 and the like. Examples are polyalcohol compounds such as mono-, di-, tri-, tetra-, or propylene glycol, 1,3-propenediol, glycerin, 1,4-butanediol, 1,3-butanediol, 1,5-pentanediol, 1,6-hexanediol, sorbitol epoxy compounds such as ethylene glycol diglycidyl ether, glycidol; alkylene carbonate compounds such as ethylene carbonate; oxetane compounds; cyclic urea compounds such as 2-imidazolidinone; and the like. The use amount of the surface-crosslinking agent is determined arbitrarily in the range of preferably 0.001 to 10 parts by mass and more preferably 0.01 to 5 parts by mass relative to 100 parts by mass of the water-absorbing resin.

Also, the traceability and sustainability rosy be further improved by obtaining these surface-crosslinking agents from natural products. Examples usable as glycerin and derivatives thereof for a surface-crosslinking agent derived from natural products include polyhydric alcohols such as 1,3-propanediol, 1,2-propanediol, and 1,4-butanediol, and from these viewpoints, polyhydric alcohols or derivatives thereof are preferably used as a surface-crosslinking agent. Additionally, a method for producing 1,4-butanediol from a natural product is disclosed in, for example, International Publication No. 2010/006070 and the like. Also, a method for producing propanediol from glycerin is disclosed in, for example, JP-A-2007-283175 and the like, which are also preferably usable. Also, lactic add and salts thereof (monovalent salts and polyvalent, metal salts of lactic acid) derived from natural products are also preferably usable as a surface-crosslinking agent or an auxiliary agent for surface crosslinking for the present invention.

Also, at the time the surface crosslinking agent is mixed with the water-absorbing resin, water can be preferably used as solvent. The amount of water to be used is determined arbitrarily in the range of preferably 0.5 to 20 parts by mass, more preferably in a range of 0.5 to 10 parts by mass, relative to 100 parts by mass of the water-absorbing resin. Further, other than above mentioned water, if necessary, a hydrophilic organic solvent can be used in combination and the amount thereof to be used is determined arbitrarily in the range of preferably 0 to 10 parts by mass, more preferably 0 to 5 parts by mass, relative to 100 parts by mass of the water-absorbing resin. Further, when surface-crosslinking agent solution is mixed, water-insoluble fine-particle powder or surfactants may be allowed to coexist to the extent that the effects of the present invention cannot be inhibited. The kinds of fine-particle powder and the surfactant to be used and their amounts and the like are exemplified in U.S. Pat. No. 7,473,739 etc., however, the amount to be used is determined arbitrarily in the range of preferably 0 to 10 parts by mass, more preferably 0 to 5 parts by mass, and still more preferably 0 to 1 parts by mass (the lower limit is preferably 0.01, more preferably 0.1 parts by mass) relative to 100 parts by mass of the water-absorbing resin. From the view point of improving traceability and sustainability, in addition to improving physical properties, lactic acid or its salt is to be used preferably. The amount to be used is determined arbitrarily in the range of preferably 0.001 to 10 parts by mass, more preferably 0.01 to 5 parts by mass relative to the water-absorbing resin.

In this step, after the water-absorbing resin and the surface-crosslinking agent are mixed, the mixture is preferably subjected to a heat treatment and thereafter to a cooling treatment if necessary. Above heating temperature at the time of the heating treatment is preferably 70 to 300° C., more preferably 120 to 250° C. and still more preferably 150 to 250° C. In the case the treatment temperature is lower than 70° C., the heating treatment time is extended and it results in decrease of the productivity and further it becomes impossible to form a uniform surface-crosslinked layer and therefore, it is not preferable. Also, in the case the treatment temperature exceeds 300° C., the water-absorbing resin is deteriorated and therefore, it is not preferable. Also, the heating time for the heating treatment is preferably in a range of 1 minute to 2 hours. The heating treatment can be carried out in a common drying machine or a heating furnace.

Additionally, surface-crosslinking treatment methods disclosed in EP Patents Nos. 0349240, 0605150, 0450923, 0812873, 0450924, and 0668080; JP-A 7.242709 and JP-A 7-224304; U.S. Pat. Nos. 5,409,771, 5,597,873, 5,385,983, 5,610,220, 5,633,316, 5,674,633, and 5,462,972; International Publications Nos. 99/42494, 99/43720, 99/42496 and the like, can be applicable in the present invention.

Other than the above-mentioned organic surface-crosslinking agents, an inorganic surface-crosslinking agent may be used alone or in combination to improve the liquid permeability, the water absorption speed, and the like. In addition to the physical properties improvement, use of the following polyvalent metals, polyamine polymers, and water-insoluble fine particles can further improve traceability. That is, trace components such as polyvalent metals, polyamine polymers, water-insoluble fine particles and remaining surface-crosslinking agents may be separated from a water-absorbing resin (by, for example, extraction with water or the like) and their configurations, whether they are used or not, their amount of use, purity, and the like may be analyzed. For example, the amount of the polyvalent metal in the form of extracted polyvalent metal cations in a water absorbing resin can be quantitatively analyzed and the quantitative analysis may be carried out by the method disclosed in JP-A-2005-113117 (EP Patent No. 1641883).

The inorganic surface-crosslinking agent may be used simultaneously with or separately from the above organic surface-crosslinking agent. Examples usable as the inorganic surface-crosslinking agent may include divalent or higher, preferably; trivalent to tetravalent polyvalent metal salts (organic salts or inorganic salts) or hydroxides. Polyvalent metals to be used are aluminum zirconium and the like, and aluminum lactate and aluminum sulfate are exemplified and preferable one is the aqueous solution containing aluminum sulfate. These inorganic surface-crosslinking agents may be used simultaneously with or separately from the organic surface-crosslinking agents. The surface-crosslinking with polyvalent metals is exemplified in international Publication Nos. 2007/121037, 2008/09843, and 2008/09842, in U.S. Pat. Nos. 7,157,141, 6,605,673, and 6,620,889, in US Patent Application Publication Nos. 2005/0288182, 2005/0070671, 2007/0106013, and 2006/0073969. Also, cationic polymers, particularly, having a mass average molecular weight of about 5000 to 1000000 may be used simultaneously or separately to improve the liquid permeability and the like. Usable cationic polymers are, preferably vinyl amine polymer and the like, exemplified in U.S. Pat. No. 7,098,284, International Publication Nos. 2006/082188, 2006/082189, 2006/082197, 2006/111402, 2006/111403, and 2006/111404 and the like. Also, inorganic fine particles may be used in a similar way, and for example, preferably silicon dioxide and the like, exemplified in U.S. Pat. No. 7,638,570 and the like.

From the viewpoint of physical properties improvement and traceability, polyvalent metals (polyvalent cations), polyamine polymers, and water-insoluble fine particles are preferably used and the use amount of them is properly determined within the range of preferably 0 to 10 parts by mass, more preferably 0.001 to 5 parts by mass, and still more preferably 0.01 to 3 parts by mass relative to 100 parts by mass of a water-absorbing resin. The polyvalent metal may be extracted and measured as a cation amount (e.g., $Al^{3+}$). For example, the amount of the polyvalent metal in the form of extracted polyvalent metal cations in a water-absorbing resin can be quantitatively analyzed and the quantitative analysis may be carried out by the method disclosed in JP-A-2005-113117 (EP Patent No. 1641883).

Also, as another method, for example, an electron probe micro analysis method (EPMA) is suitable for qualitative analysis of elements existing in the periphery of the surface of a water absorbing resin and therefore, the types of polyvalent metals can be determined. The analysis technique is preferably employed as primary screening for on unknown sample, That is, in order to distinguish an object water-absorbing resin to be traced among a plurality of unknown samples, first, the above-mentioned analysis is carried out for the selection and a carbon isotope ratio may be measured for the remaining samples.

(2-7) Fine Powder Recycle Step

In the present invention, fine powder may be collected if necessary. This step is a step of recycling a fine powder (particularly, a fine powder containing particles 150 μm or less in an amount of 70 weight % or more) obtained by drying step and if necessary pulverization step and classification step to the polymerization step or the drying step after separation, as it is or after hydration. The methods described in US Patent Application Publication No. 2006/247351 and U.S. Pat. No. 6,228,930 and the like can be employed.

(2-8) Other Steps

Besides the above mentioned steps, if necessary, as surface treatment step of the polyvalent metal, a recycle step of the evaporated monomer, a granulation step, a fine powder removal step, and the like may be provided. Further, for the stabilizing effect for color hue with the lapse of time, preventing gel deterioration and the like, the above-mentioned additives may be used to some or all of the respective steps if necessary.

The surface treatment step of the polyvalent metal salts is employed in the case of requiring the liquid permeability under high pressure (SFC and GBP) and production methods disclosed in U.S. Pat. Nos. 6,005,673 and 6,620,800 are employed if necessary.

(2-9) Removal of Propionic Acid From Water-Absorbing Resin

In the case where acrylic acid is obtained from biomass of the present invention, a saturated organic acid in acrylic acid, particularly acetic acid and propionic acid, and particularly propionic acid may be increased more than in conventional acrylic acid in some cases. Regarding such saturated organic acids, in the present invention, propionic acid (boiling point 141° C.; 760 mmHg) is allowed to exist in the polymerization, but may cause acid smell or the like after the polymerization. Also, since a saturated organic carboxylic acid such as acetic add and propionic acid has a chemical structure and a boiling point close to these of acrylic acid (boiling point 141° C. same), separation and refinement by crystallization and distillation is difficult at the time of acrylic acid production and is accompanied with problems of production cost increase and decrease of yield of acrylic acid. Therefore, the saturated organic carboxylic add is preferably removed from the polyacrylic acid (salt) during polymerization or after polymerization, particularly after polymerization utilizing that a saturated organic carboxylic acid is not polymerized.

Also, M the above-mentioned production method involving removal of propionic acid after polymerization, no excess retaking is needed for acrylic acid and therefore, economical raw material acrylic acid can be used and consequently, a water-absorbing resin with good physical properties and free from malodor can be obtained economically and stably.

Accordingly, propionic acid at the time of polymerization may be removed from a water absorbing resin during the polymerization (particularly the latter half of the polymerization and more particularly at the polymerization degree of 90% or more) or after the polymerization as IA required and, for example, 5 mass or more, preferably 15 mass %; or more, more preferably 30 mass % or more, still more preferably 40 mass % or more, particularly preferably 50 mass % or more, and even more preferably 70 mass % or more of the propionic acid to be used is removed. The amount of the saturated organic carboxylic acid in a water-absorbing resin obtained in such a manner, particularly the total amount of acetic acid and propionic acid, and more particularly the amount of propionic acid is preferably 2 mass % or less, more preferably 5000 ppm or less, still more preferably 5000 ppm or less, further still more preferably 2000 ppm or less, particularly preferably 1500 ppm or less, and most preferably 1000 ppm or less in terms of malodor. A small amount of the residue does not cause any malodor problem and propionic acid may exhibit an antibacterial property in some cases and thus, in terms of the removal cost, the lower limit of propionic acid is preferably about 10 ppm and farther preferably about 100 ppm. From the viewpoint of malodor of a water-absorbing resin, the residual propionic acid is preferably a salt type (propionic acid salt, particularly a monovalent salt) rather than an acid type and consequently, the water-absorbing resin is neutralized to an extent of the above mentioned neutralization rate and preferably to a prescribed ratio or more.

A method of removing propionic acid may be extraction, washing, evaporation and the like and preferably evaporation is employed, and heating may be carried out at a temperature equal to or higher than the boding point (141°

C.) under normal pressure or reduced pressure. Examples of a heating method include a drying step or heating in a surface crosslinking step, and particularly preferably heating for a prescribed duration at a prescribed temperature or higher in a hydrated state. Also, at the time of removal of propionic acid, it is also preferable to remove, particularly evaporate, an organic acid such as acetic acid and acrylic acid to be in an amount within the above-mentioned range at the same time. Also, various kinds of organic solvents, e.g. water and hydrophilic and hydrophobic organic solvents, may be used for extraction and washing. Furthermore, in the case of azeotropic dehydration in a hydrophobic organic solvent described later, a saturated organic carboxylic acid, particularly propionic acid, can be efficiently removed even by heating at a temperature lower than the boiling point of propionic acid and thus it is preferable.

The heating conditions may be adjusted on the basis of the heating time in the above-mentioned drying step or surface crosslinking, and the heating may be carried out preferably at 150 to 250° C., more preferably at 165 to 230° C. preferably for 10 minutes or longer. The heating time is more preferably IS minutes b 32 hours and still more preferably 20 minutes to 1 hour. Lithe heating is carried out under the above-mentioned conditions, a hydrogel with a moisture content ratio of preferably 80 to 3 mass % and particularly preferably 70 to 5 mass % can be obtained. Also, the heating treatment of the hydrogel is preferably performed by hot-air drying in a hot air volume of 0.1 to 5 [m/s] more preferably 0.5 to 3 [m/s] in the above-mentioned dew point range, that is, the dew point of hot air preferably in the range of 40 to 100° C. and more preferably in the range of 50 to 90° C. Additionally, the azeotropic dehydration in the hydrophobic organic solvent, which is another suitable drying means, will be described later.

In the case neither water nor air blow is available, removal of propionic acid may be insufficient even by heating, and the obtained water-absorbing resin may sometimes emit acid smell. Also, in the case where the dew point is low, the removal tends to be insufficient.

Also, it is found that azeotropic dehydration in a hydrophobic organic solvent is preferable for removal of propionic acid after polymerization. A preferable removal method to be applied is azeotropic dehydration which is employed for drying in reverse phase suspension polymerization, A hydrophobic organic solvent to be employed is generally a low boiling point hydrophobic organic solvent with a boiling point of preferably 60 to 140° C. and still more preferably about 80 to 120° C. and in the present invention, it was found that propionic acid can be extremely efficiently removed by polymerization in a solvent with a low boiling point, particularly a solvent with a boiling point lower than that of propionic acid (141° C.) or by azeotropic dehydration (the upper limit of the heating temperature is the boiling point of the solvent).

The reverse phase suspension polymerization is a polymerization method involving suspending an aqueous monomer solution in a granular state with a mass average particle diameter of about 1 to 0.1 mm in a hydrophobic organic solvent and has an advantage that it is possible to obtain gel particles with a product particle diameter simultaneously with polymerization. The polymerization is described in, for example, U.S. patents such as U.S. Pat. Nos. 4,093,776, 4,367,323, 4,446,261, 4,683,274, and 5,244,735. In the present invention, a dispersant selected from surfactants and protection colloids may be dissolved or dispersed in the aqueous solution of monomers, as required. Particularly in the case where the reverse phase suspension polymerization is employed in the present invention, addition of the dispersant to the aqueous monomer solution gives the finally obtained water-absorbing resin in a narrowed particle diameter distribution since the monomer or the granular state polymer is dispersed more evenly in the hydrophobic organic solvent.

Examples of the surfactants include (polyoxyethylene) phosphoric acid esters such as polyoxyethylene octyl phenyl ether phosphoric acid ester and polyoxyethylene tridecyl ether phosphoric acid ester (both produced by Darichi Kogyo Seiyaku Co., Ltd.: Plysurf (registered trademark)); nonionic surfactants such as polyoxyethylene alkyl ethers, polyoxyethylene alkyl phenol ethers, polyoxyethylene alkyl esters, sorbitan fatty acid esters, polyoxyethylene sorbitan fatty acid eaters and sucrose fatty acid esters; and anionic surfactants such as higher alcohol sulfuric acid esters, alkylnaphthalenesulfonic acid salts, alkyl polyoxyethylene sulfate salts and dialktylsulfosuccinic acid salts, and the like, and one or more surfactants among them may be separately selected and used and the surfactants may be added collectively or separately to the polymerization system. Further, examples of the polymer protection colloids include ethyl cellulose, ethyl hydroxy cellulose, maleic acid (anhydride)-ethylene copolymers, maleic acid (anhydride)-butadiene copolymers, and the like. Especially, fatty acid ester type surfactants, further nonionic surfactants or anionic surfactants with a HLB of 8 or more are preferable. The use amount of the surfactant or dispersant is generally 0.05 to 10 mass % and preferably 0.5 to 5 mass to the monomer.

The hydrophobic organic solvent to be used as a medium for the reverse phase suspension polymerization in the present invention is not particularly limited as long as it does not mix with the aqueous monomer solution and forms two phases and examples thereof include aliphatic hydrocarbons such as n-pentane, n-hexane, n-heptane and n-octane; alicyclic hydrocarbons optionally having substituents such as cyclohexane, cyclooctane, methylcyclohexane and decalin; and aromatic hydrocarbons optionally having substituents such as benzene, ethylbenzene toluene and xylene, and the like, and one of these compounds or a mixture of two or more of these compounds may be used. Particularly preferable one is n-hexane (boiling point 69° C.), n-heptane (boiling point 98° C.), cyclohexane (boiling point 81° C.), methylcyclohexane (boiling point 110° C.), toluene (boiling point 81° C.), or xylene (boiling point 139° C.). The mass ratio of the hydrophobic organic solvent to the aqueous monomer solution is preferably about 3:2 to 4:1. The dispersant or the hydrophobic organic solvent may be added separately during the polymerization or after polymerization.

The monomer is collectively or separately dispersed in the solvent and the solvent in which the monomer or its polymer is dispersed may be heated at a temperature in the range of preferably 40 to 90° C. and more preferably 50 to 80° C. for a duration in the range of preferably 0.5 to 10 hours and more preferably 1 to 5 hours to early out polymerization. The mass average particle diameter at the time of dispersing is generally in the range of 10 to 2000 μm and preferably in the range of 100 to 1000 μm in terms of physical properties aspect, and still more preferably in the range of 200 to 600 μm, and the contents of fine powders with a diameter of 850 μm or larger or 150 μm or smaller are preferably as small as possible, more concretely, preferably 10 mass % or less and still more preferably 5 mass % or less for the respective powders. They may be properly adjusted by types and amounts of the dispersant and the solvent, the agitation power, granulation, and the late.

The polymerization can be moderately controlled by carrying out the reverse phase suspension polymerization in the present invention. Also, as a significant advantage of the reverse phase suspension polymerization, as compared with common hot-air drying, in the case of employing drying at a low temperature (the upper limit of heating is the boiling point of the solvent) by azeotropic dehydration in the hydrophobic organic solvent, removal, of propionic acid after polymerization is easy in spite of low temperature drying (drying in the low boiling point organic solvent). Also, from the viewpoint of propionic acid removal, employment of the above-mentioned azeotropic dehydration is preferable also in the case where aqueous solution polymerization is performed when polymerization and in that case, the above-mentioned surfactant and dispersant are used as required, to disperse the water-containing gel-like polymer after the aqueous solution polymerization in the above-mentioned hydrophobic organic solvent, and then azeotropic dehydration may be carried out in the hydrophobic organic solvent. The solid content alter the drying is within the above-mentioned range and the water-absorbing resin is separated from the hydrophobic solvent by filtration after the azeotropic dehydration and the hydrophobic organic solvent and the like may be further dried out if necessary. Also, the hydrophobic organic solvent containing propionic, acid, die surfactant and the like may be distilled and recycled. Also, surface crosslinking is arbitrary and may be carried out in a dispersion system of the hydrophobic organic solvent or in a powder system after filtration.

(2-10) Addition Step of Basic Substance

Since propionic acid and acetic acid have lower boiling points as compared with hydroxypropionic acid, in the case where a water-absorbing resin obtained by the present invention has a malodor (acid smell) problem, a step of adding a basic substance is preferably farther included after the polymerization step when acrylic acid containing a large amount of propionic acid and acetic acid (e.g.; 400 ppm or more) is used.

That is, from the viewpoint of acid smell derived from a saturated organic acid (particularly propionic acid), the neutralization rate is preferably as high as possible, and from the viewpoint of removal at the time of drying, the neutralization rate is preferably as low as possible. Accordingly, from the viewpoint of acid smell, the neutralization rate at the time of polymerization, still more preferably the neutralization rate before drying is adjusted to preferably 80% by rook or lower, more preferably 70% by mole or lower, and still more preferably 60% by mole or lower, or a basic substance is added to the polymer powder surface as a preferable embodiment. Also, as described above, in order to reduce the acid smell, the neutralization rate of the obtained water-absorbing resin is adjusted to be in the range of 10 to 100% by mole, further in the range of 30 to 95% by mole, and the final neutralization rate is preferably adjusted to be high and is increased to 95% by mole or more, 70% by mole or more, 75% by mole or more, 80% by mole or more, 85% by mole or more, and 90% by mole or more in this order, Such adjustment of the neutralization rate is performed by adding a base dining the polymerization of the monomer or after polymerization.

Addition of a basic substance decreases the acid smell and improves the liquid permeability and the like. The basic substance is preferably added after drying, or after pulverization, and particularly preferably after surface crosslinking. Consequently, the surfaces of the water-absorbing resin particles are controlled to be basic. Examples of usable basic substances to be added include inorganic and organic basic substances and further water-soluble bases and water dispersible bases.

(2-11) Water-Soluble Polyacrylic Acid (Salt)

From the viewpoint of the object and the effect of the present invention, a water-insoluble and water-swelling polyacrylic acid (salt) (named also as: polyacrylic acid (salt)-type water absorbing resin) is most preferably applied to the present invention, and a water-soluble polyacrylic acid (salt) can also be applied to the present invention.

The water-soluble polyacrylic acid (salt) has a carbon stable isotope ratio ($\delta^{13}C$), $^{14}C$, and a hydrogen isotope ratio within the ranges described in (2-1) and also contains, as other trace components, p-methoxyphenol, 3-HPA, and the like in the above-mentioned ranges so that it can be a water-soluble polyacrylic acid (salt) having excellent traceability.

That is, a polyacrylic acid (salt) of the present invention is selected from water-insoluble and water-swelling polyacrylic acid (salts) (named also as polyacrylic acid (salt)-type water absorbing resins) or water-soluble polyacrylic acid (salts) (named also gas polyacrylic acid (salt) type water-soluble polymers) as a superordinate concept of polyacrylic acid (salt)-type water-absorbing resins.

A water-soluble polyacrylic acid (salt) of the present invention can be obtained as long as a water-soluble polymer is obtained, that is, by substantially not using a crosslinking agent at the time of polymerization or after polymerization in the production method described in above (2-1) to (2-10), particularly in (2-1) to (2-5). A water-soluble polyacrylic acid (salt) having a prescribed $^{13}C$ volume can be obtained by using acrylic acid described in above (2-1) without easing a crosslinking agent in the polymerization step described in (2-2).

Also, (2-3) the dying step after polymerization is optional in the production of a water soluble polyacrylic acid (salt) and the water-soluble polyacrylic acid (salt) may be used as a product as it is as en aqueous polymer solution without drying, or may be made into a water-soluble polymer powder through (2-3) the drying step and (2-4) the pulverization and classification step. In this case, the molecular weight is determined properly in the range of preferably 500 to 10,000,000, more preferably 1000 to 1,000,000, and still more preferably 10,000 to 200,000. The molecular weight can be controlled by a chain transfer agent, a polymerization initiator, a polymerization concentration, and the like at the time of polymerization. The neutralization rate of the water soluble polyacrylic add (salt) is preferably 0 to 100% by mole and more preferably 0% by mole or 100% by mole. The concentration in the case of an aqueous polymer solution is determined properly and within the above-mentioned polymerization concentration.

A method employed for producing the water-soluble poly acrylic acid (salt) may be the method disclosed in JP-A-2009-252498, JP-A-2003-02909, JP-A 8-239423, or the like and may involve polymerization using acrylic acid described in above (2-1).

[3] Polyacrylic Acid (Salt)-Type Water Absorbing Resin

The present invention provides the above-mentioned polyacrylic acid (salt) and a production method thereof and is particularly preferably employed for a polyacrylic acid (salt)-type water-absorbing resin which has been particularly difficult to be analyzed (traced) because the molecular weight measurement and Tg (glass transition point) measurement are impossible. Hereinafter, a polyacrylic acid (salt)-type water-absorbing resin will be mainly described.

A water-absorbing resin of the present invention contains a polyacrylic add (salt)-type water-absorbing resin as a main component and is obtained by the above-mentioned polymerization method, surface-crosslinking method, and the like in the case where the water-absorbing resin is used for sanitary materials, particularly disposable diapers. It is preferable for the water-absorbing resin to be obtained that at least one physical property among the physical properties described in the following (3-1) to (3-7) are controlled, and still more preferably two or more physical properties including AAP and particularly preferably three or more physical properties are controlled. In the case where the water-absorbing resin does not satisfy the following physical properties, sufficient function may not be exhibited if it is used for high concentration diapers with a water-absorbing resin concentration of 40 mass % or more. Control of the physical properties as specified can increase the traceability after production in the present invention.

(3-1) Initial Color Hue

Water absorbing resin to be obtained by the present invention is preferably white powder to be used as raw material for sanitary materials such as paper diaper and the like. Therefore, in a Hunter Lab system measured by (spectrocolorimeter), as initial color hue, the L value (lightness) is preferably 55 or more, more preferably 57 or more, and still more preferably 89 or more. Also, the a value is preferably −2 to 2, more preferably −1 to 1, still more preferably −0.5 to 1, and particularly preferably 0 to 1. Further, the b value is preferably −5 to 10, more preferably −5 to 5, and still more preferably −4 to 4. Additionally, the upper limit of the above mentioned L value is 100, however, if its indicate 85 or more, the problem brought by color hue in sanitary materials and the like does not arise. Also, the (Yellow Index) value is preferably 10 or less, more preferably 8 or less, and still more preferably 6 or less. Further, the WB (White Balance) value is preferably 70 or more, more preferably 75 or more, and still more preferably 77 or more.

The above initial color hue means the color hue of particulated water absorbent agent after its production and in general, it is the color hue measured before shipment from a plant. It may be a color hue measured within 1 year from the production in the case of preservation in an atmosphere at 30° C. or lower and a relative humidity of 50% RH.

(3-2) Color Hue With the Lapse of Time

Water-absorbing resin according to the present invention, as mentioned above, is used as raw material for sanitary materials such as paper diaper and the like. Therefore, it is preferable to maintain its clean whiteness even under the long-term storage in high temperature and high humidity. Therefore, in a Hunter Lab system measured by (spectrocolorimeter), as color hue with the lapse of time, the L value (Lightness) is preferably at least 80, more preferably 81 or more, still more preferably 82 or more, and particularly preferably 83 or more. Also, the a value is preferably −3 to 3, more preferably −2 to 2, and still mom preferably −1 to 1, Further, the b value is preferably 0 to 15, more preferably 0 to 12, and still more preferably 0 to 10. Additionally, the upper limit of the above mentioned L value is 100, however, if its indicate 80 or more, the problem brought by the long-term storage in high temperature and high humidity does not arise substantially.

The above mentioned color hue with the lapse of time means the color hue measured after exposing the water-absorbing, resin 7 days in an atmosphere at 70±1° C. and a relative humidity of 65±1% RH.

(3-3) CRC (Water Absorption Capacity Without Load)

CRC (water absorption capacity without load) of the water-absorbing resin obtained by the present invention is, measured by ERT441.2-02 measuring method, preferably 10 [g/g] or higher, more preferably 20 [g/g] or higher, still more preferably 25 [g/g] or higher, and particularly preferably 30 [g/g] or higher. The upper limit of CRC is not specifically limited but preferably 50 [g/g] or lower, more preferably 45 [g/g] or lower, and still more preferably 40 [g/g] or lower. If CRC is lower than 10 [g/g], the water absorbing-resin exhibit low in water absorption amount which resulted in that the water-absorbing resin is not suitable for use in absorbent in wait materials such as disposable diapers. Also, if CRC is higher than 50 [g/g], there is a fear that sanitary material cannot be obtained, which exhibits an excellent liquid-absorption rate is a water-absorbing product such as a disposal diaper when such a water-absorbing resin is used as a absorbent which is not preferable. CRC can be controlled by, for example, the internal crosslinking agents or the surface-crosslinking agents and the like, which have been described above.

(3-4) AAP (Water Absorption Capacity Under Load)

In order to prevent leakage in a diaper, AAP (water absorption capacity under load) of the water-absorbing resin obtained by the present invention is controlled under a pressure of 1.9 kPa, still more preferably 4.8 kPa to be preferably 20 [g/g] or higher, more preferably 22 [g/g] or higher, and still more preferably 24 [g/g] or higher as one example of means for accomplishing the above mentioned particle size control and the surface-crosslinking. The upper limit of AAP is not specifically limited, however, from the view point of the balance with the other physical properties, the upper limit thereof is 40 [g/g] or lower. If above mentioned AAP is lower than 20 [g/g], there is a fear that sanitary material cannot be obtained, which exhibits a reduced return of liquid (usually referred to as "Re-Wet") occurring when a pressure is applied to the water-absorbent, when such a water-absorbing resin is used as a absorbent which is not preferable. Here in, AAP can be adjusted by the above mentioned surface crosslinking agent or the particle size.

(3-5) SFC (Saline Flow Conductivity)

In order to prevent leakage in a diaper, SFC (Saline Flow Conductivity) of the water absorbing resin obtained by the present invention is, under a pressure, preferably 1 $[\times 10^{-7} \cdot cm^3 \cdot s \cdot g^{-1}]$ or higher, more preferably 10 $[\times 10^{-7} \cdot cm^3 \cdot s \cdot g^{-1}]$ or higher, still more preferably 50 $[\times 10^{-7} \cdot cm^3 \cdot s \cdot g^{-1}]$ or higher, particularly preferably 70 $[\times 10^{-7} \cdot cm^3 \cdot s \cdot g^{-}]$ or higher, and most preferably 100 $[\times 10^{-7} \cdot cm^3 \cdot s \cdot g^{-1}]$ or higher as one example of means for accomplishing the above mentioned particle size control and the surface-crosslinking. The upper limit of SFC is not specifically limited, however, preferably 3000 $[\times 10^{-7} \cdot cm^3 \cdot s \cdot g^{-1}]$ or lower, and more preferably 2000 $[\times 10^{-7} \cdot cm^3 \cdot s \cdot g^{-1}]$ or lower. If above mentioned SFC is over 3000 $[\times 10^{-7} \cdot cm^3 \cdot s \cdot g^{-1}]$, there is a fear that a water absorbent may cause liquid leakage when such a water-absorbing resin is used as a water absorbent which is not preferable. Here in, SFC can be adjusted by the above mentioned drying method and the like.

(3-6) Ext (Water Soluble Components)

Ext (water soluble components) of the water-absorbing resin obtained by the present invention is, measured by ERT470.2-02 measuring method, preferably 35 mass % or lower, more preferably 25 mass % or lower, still more preferably 15 mass % or lower, and particularly preferably 10 mass % or lower. If the amount of above Ext is greater than 35 mass %, the water-absorbing resin may have reduced its gel strength and deteriorated liquid permeability. Also, there is a fear that a water-absorbing resin cannot be obtained, which exhibits a reduced return of liquid (Re-Wet) occurring when a pressure is applied to the water-absorbent, when such a water-absorbing resin is used as water absorbent which is not preferable. Here in, Ext can be adjusted by the above mentioned internal crosslinking agents and the like.

(3-7) Residual Monomers

Residual Monomers of the water absorbing resin obtained by the present invention are, measured bye ERT410.2-02 measuring method, preferably 1000 ppm or lower, more preferably 500 ppm or lower, still more preferably 400 ppm or lower, particularly preferably 300 ppm or lower, and most preferably 200 ppm or lower. Here in, Residual Monomers can be adjusted by the above mentioned polymerization method and the like described above.

(3-8) FSR (Free Swell Rate/Water Absorbing Rate)

Water absorbing rate defined by time until swelling 20 times against saline is 0.1 [g/g/s] or higher, further 0.15 [g/g/s] or higher, 0.15 [g/g/s] or higher, further 0.30 [g/g/s] or higher. The upper limit thereof is from the view point of the balance with the other physical properties, 2.00 [g/g/s] or lower, further about 1.00 [g/g/s]. FSR (water absorbing rate) [g/g/s] can be measured by 1.00 g of water-absorbing resin powder or surface-treatment water-absorbing resin against 20 g of a saline solution according to the measurement method disclosed in the International Publication of 2009/016055.

(3.9) Particle Size (PSI) (ERT 420.2-02)

The particle size is preferably in the range of above described (2-5) Pulverization step and Classification step, Having the particle size above, water-absorbing resin becomes excellent in water absorbing rate, liquid permeability, water absorption capacity under load and the like.

(3-10) Other Trace Components

From the viewpoint of decreasing residual monomers, as a trace component other than residual monomers in a water absorbing resin obtained by the present invention, the amount of 3-HPA is preferably 1000 ppm or less, further preferably 500 ppm or less, 300 ppm or less, and particularly preferably 100 ppm or less. Also, from the viewpoint of decreasing acid smell, the amount of propionic acid (preferably acetic acid) is also 1000 ppm or less and they are preferably decreased to the above-mentioned ranges. Further, from the viewpoint of suppressing coloration, Fe, (di)hydroxypropionic acid, and the polymerization inhibitor (particularly, p-methoxyphenol) are also preferably decreased to the above-mentioned ranges. A trace component can be extracted from a water-absorbing resin and quantitatively analyzed by liquid chromatography (HPLC) or the like, similarly to the residual monomers. That is, for the above-mentioned reason, it is preferable that a water-absorbing resin of the present invention simultaneously satisfies one or more, more preferably two or more, still more preferably three or more, and particularly preferably four of the following contents.

The content of 3-hydroxypropionic acid is 1000 ppm or less and further within the range described in (3-9).

The content of a polymerization initiator (particularly p-methoxyphenol) is 1 to 160 ppm, and further within the range described in (2-1) and preferably 5 to 60 ppm, more preferably 6 to 40 ppm, still more preferably 8 to 30 ppm, and particularly preferably 8 to 20 ppm.

The Fe content is 0 to 2 ppm and further within the range described in (2-2).

The content of mono- or di-hydroxyacetone is 0 to 10 ppm or less and further within the range described in (2-1).

From the viewpoint of traceability and physical properties (particularly, liquid permeability and anti-caking), the water-absorbing resin is preferably coated with one or more kinds of surface treatment, agents selected from polyvalent metal salts, polyamine polymers, and water-insoluble inorganic particles.

[4] Identification Method/Tracing Method for Polyacrylic Acid (Salt), Particularly, Polyacrylic Acid (Salt)-Type Water-Absorbing Resin The present invention provides an identification method/tracing method for a polyacrylic acid (salt) after production, which is an identification method/tracing method for quantitatively analyzing $^{13}C$ in the polyacrylic acid (salt).

To identity/trace particularly a polyacrylic acid (salt)-type water-absorbing resin, a water absorbing resin incorporated in a disposable diaper or the like or a water-absorbing resin buried in the soil is taken out and $^{13}C$ volume may be quantitatively analyzed. To improve the accuracy for identification and tracing of a water-absorbing resin, the physical properties of the water-absorbing resin may be measured and trace components may be quantitatively analyzed.

The physical properties to be analyzed include water absorption rate, water absorption capacity under load, particle size distribution, soluble components, particle size, liquid permeability, and the like and the trace components to be analyzed include residual monomers, residual unsaturated organic acids (particularly, propionic acid), residual crosslinking agents, and the like, Preferably a plurality of, further preferably three or more kinds of, or five or more kinds of physical properties and trace components are analyzed for a certain water-absorbing resin and the water absorbing resin may be identified and/or traced by comparing the analysis results with those of past standard samples (preserved water-absorbing resins or products equivalent thereto). Additionally, a measurement method for the physical properties and trace components of a water-absorbing resin is not limited to those disclosed in the present invention and similar, equivalent or novel measurement methods and analysis methods disclosed in, for example, the above-mentioned Patent Documents 1 to 21 and the like may be employed as long as the object of the present invention is accomplished and the results may be compared with those of standard samples.

[5] Use of Polyacrylic Acid (Salt)-Type Water-Absorbing Resin

Use of the water-absorbing resin obtained by the production process of the present invention is not particularly limited and the water-absorbing resin may be used for absorbing articles including sanitary materials such as paper diapers, sanitary napkins, and pads for incontinent, water retention agents for agriculture and horticulture, solidifying agents for waste liquids, and industrial water shielding materials and the like.

A water-absorbing resin of the present invention contains a tracer which makes it easy to determine in which factory, which plant, and which production line, the water-absorbing resin is produced and with which various troubles of the water-absorbing resin possibly occur before it is disposed can be verified by returning to the production process of the water-absorbing resin. Concretely, it is made possible to identify and trace a water-absorbing resin distributed to the market after production by quantitatively analyzing $^{13}C$ volume. Also, it is made possible to provide a $CO_2$-reducing and carbon-neutral water-absorbing resin by using a C4 plant as a carbon source for acrylic acid in order to control the $^{13}C$ volume.

Also, as compared with a conventional natural product-based water-absorbing resin, the water-absorbing resin has much better physical properties although it is derived from a nonfossil raw material and the raw material cost can be properly adjusted as compared to a conventional water-absorbing resin which considerably depends on the prices of petroleum.

The water-absorbing resin obtained in the present invention exhibits particularly excellent performance in the form of an absorbing product using the water-absorbing resin in a high concentration. That is, the content. (core concentration) of the water-absorbing resin in an absorption body in the absorbing product is preferably 30 to 100 mass more preferably 40 to 100 mass %, still more preferably 50 to 100 mass %, farther still more preferably 60 to 100 mass %, particularly preferably 70 to 100 mass %, and most preferably 75 to 95 mass %. The effect of the present invention can be exhibited more by controlling the core concentration in the above-mentioned range, which is preferable, hi the case where the water-absorbing resin obtained by the present invention is, particularly, used for an upper layer part of an absorbing body in the above-mentioned core concentration range, owing to the high liquid permeability (liquid permeability under pressure), the water-absorbing resin is excellent in the dispersibility of an absorbed liquid such as urine and the like and the absorption amount in the entire absorbing product such as a disposable diaper and the like is improved owing to the efficient liquid distribution and therefore, the water-absorbing resin is preferable. Further, the water-absorbing resin is preferable since it can provide an absorbing product which keeps a white color state giving dean impression.

[6] Use of Polyacrylic Acid (Salt)

The polyacrylic acid (salt) of the present invention is a powder or an aqueous solution (the concentration is, for example, 1 to 80 wt %) containing a polyacrylic acid (salt)-type water-absorbing resin as a main component and is usable for builders, thickeners, liquid detergents, dispersants, poultices, and the like, in the present invention, the traceability after production or for various applications can be improved.

EXAMPLES

The present invention will be described below by referring to Examples. However, the present invention is not limited to these Examples. In addition, "liter" may be represented as "L", and "% by mass" may be represented as "wt %", for convenience, Additionally, various physical properties of the water-absorbing resin of the present invention were measured under the conditions of a room temperature (20 to 25° C.) and a humidity of 50 RH %, unless otherwise indicated.

Following physical properties ware measured with reference to ERT.
(a) "CRC" (ERT441.2-02)
(b) "AAP" (ERT442.2-02)—load 1.9 kPa, further 4.9 kPa
(c) "Ext" (ERT470.2-02)
(d) "FSC" (ERT440.2-02)
(e) "Residual Monomers" (ERT410.2-02)
(f) "PSD" (ERT420.2-02)
[SFC (Saline Flow Conductivity)]

SFC (saline flow conductivity) is the value indicating liquid permeability of water absorbing resin in swollen state. Higher value indicates that it possess high liquid permeability. Additionally, SFC was measured in accordance with the method disclosed in U.S. Pat. No. 5,849,405.

[Moisture Content]

A water-absorbing resin in an amount of 1.00 g was weighed in an aluminum cup with a bottom surface diameter of about 50 mm and the total weight W8 [g] of the sample (the water absorbing resin and the aluminum cup) was weighed.

Next, the sample was stood still in an oven at an ambient temperature of 180° C. and the water-absorbing resin was dried. After a lapse of 3 hours, the sample was taken out of the oven and cooled to room temperature in a desiccator. Thereafter, the total weight W9 [g] of the sample (the water-absorbing resin and the aluminum cup) after drying was measured and the moisture content (unit; [mass %]) was calculated according to the following expression.

Moisture content [wt %]=(W8−W9)/(weight of particulated water-absorbent agent [g]))×100     [Mathematic 2]

[Mass Average Particle Diameter (D50), Mass Percentage of Particles With Particle Diameter Smaller Than 150 μm, and Logarithmic Standard Deviation (σζ) of Particle Size Distribution]

A water-absorbing resin in an amount of 10.00 g was classified by using JIS standard sieves having the following meshes and the mass after every sieving was measured and the mass percentage of the particles with a particle diameter smaller than 150 μm was calculated. The residue percentage R for respective particle sizes was plotted on probability plotting paper and based on the graph, the particle diameter corresponding to R=50 mass % was read as the mass average particle diameter (D50). Additionally, the mass average particle diameter (D50) means the particle diameter of the standard sieve corresponding to 50 mass % in the entire particles, as disclosed in the specification of U.S. Pat. No. 5,051,259 and the like. Further, the logarithmic standard deviation (σζ) of particle size distribution was calculated according to the following expression. Additionally, a smaller value of the logarithmic standard deviation (σζ) of particle size distribution means that the particle size distribution is narrower.

σζ=0.5×ln(X2/X1)     [Mathematic 3]

Here in, the particle is the one equivalent to X1 is R=84.1 mass %, X2 is R=15.9 mass %.

As the above JIS standard sieve (The IIDA TESTING SIEVE; internal diameter 80 mm) having mesh of 850 μm, 710 μm, 600 μm, 500 μm, 425 μm, 300 μm, 212 μm, 150 μm, 106 μm, and 45 μm is prepared. Classification was carried out for 5 minutes by a low-tap type sieving vibrator (Model ES-65 sieving vibrator, manufactured by Iida Seisakusyo).

[Color Hue Evaluation for Water-Absorbing Resin]

Color hue evaluation for a water-absorbing resin was carried out using Hunter Lab color system. Additionally, Lab Scan (registered trademark) XE manufactured by Hunter Lab Corp. was used as a measurement apparatus (spectrocolorimeter) and reflection measurement was selected as the measurement condition. Also, a container for a powder/paste sample (inner diameter 30 mm, height 12 mm), a standard round white plate No. 2 for a powder/paste, and a 30 floodlighting pipe were used.

The above-mentioned container for a powder/paste sample was filled with about 5 g of a water-absorbing resin and the L value (Lightness lightness index), a value, and b value of the water-absorbing resin surface were measured by the above-mentioned spectrocolorimeter in an atmosphere of room temperature (20 to 25° C.) and a relative humidity of 50 RH %.

In the present invention, color hue of water-absorbing resin immediately after production or water-absorbing resin within 1 year from the production in the case of preservation in an atmosphere at 30° C. or lower and a relative humidity of 50 RH % or lower is called "initial color hue". And the L value measured on this occasion is called "Lightness index before exposure".

Also, "Lightness index after exposure" is measured by doing following operation as "coloration acceleration test".

The above-mentioned colorations acceleration test was carried out by putting the container for a powder/paste sample filled with about 5 g of a water-absorbing resin in a therram-hygrostat (Small environment tester model SH-641, manufactured by ESPEC Corp.) controlled to an atmosphere of a temperature of 70±1° C. and a relative humidity of 65±1 RH % and exposing the water-absorbing resin to the atmosphere for 7 days.

The color hue of water-absorbing resin after above mentioned exposure is called "color hue with the lapse of time" and the L value measured on this occasion is called "Lightness index after exposure".

As the above-mentioned L value is closer to 100, the whiteness increases; and as the a value and the b value are closer to 0 (zero), it means that coloration is less and the color is substantially white.

[$\delta^{13}C$ (Carbon Stable Isotope Ratio)]

The carbon stable isotope ratio $\delta^{13}C$ was calculated by converting a sample into $CO_2$ by a pretreatment method (ASTM D6866/Method B) defined by American Society of Testing and Materials, subsequently graphitizing $CO_2$ by complete reduction treatment using an iron catalyst, and subjecting the graphitized sample to accelerator mass spectrometry. Additionally, the calculation is carried out referring to (1-7) "Carbon stable isotope ratio $\delta^{13}C$" and Expression 1. Also, PDB is an abbreviation of Pee Dee Belmnite and shows a standard of $\delta^{13}C/^{12}C$.

Also, as a standard for $^{14}C$ concentration, graphite synthesized from an oxalic acid standard substance (HOx11) provided by U.S.A. National Institute of Standards and Technology was employed. Carbon isotope ratios ($^{14}C/^{12}C$ ratio and $^{13}C/^{12}C$ ratio) of a sample and a standard were measured by accelerator mass spectrometry method and the $^{14}C$ concentration was calculated from these measurement results. Regarding carbon contained in a sample, the mixing ratio of carbon derived from biomass to carbon derived from a fossil raw material can be evaluated using the measured $^{14}C$ concentration of the sample.

That is, a polyacrylic acid (salt) of the present invention can be identified or traced by converting carbon composing the polyacrylic acid (salt) into $CO_2$ and further converting the obtained $CO_2$ into graphite (C), and carrying out accelerator mass spectrometry method for the carbon isotope ratio. Also, the hydrogen isotope ratio can also be analyzed separately after hydrogen composing a polyacrylic acid (salt) is converted into $H_2$.

[Other Trace Components]

According to above (e) "Residual Monomers" (ERT 410.2-02), an extracted solution obtained by dispersing a water-absorbing resin or a polyacrylic acid (salt) in saline and filtering the saline was subjected to liquid chromatography to analyze the amounts of hydroxypropionic acid, propionic acid, p-methoxyphenol, and the like in the extracted solution. A column, an eluent, and a calibration curve for the liquid chromatography are properly set in accordance with trace components.

[Weather Resistance (Light Fastness)]

According to the paragraphs [0305] to [0309] in International. Publication No. 2011/040530, 60 g of a swollen gel magnified 20 times obtained from 3.0 g of a water-absorbing resin was irradiated with ultraviolet rays at an irradiation intensity of 60 [$mW/cm^2$] for 1 minute and the increase amount (%) of water soluble components of the swollen gel by the ultraviolet irradiation was specified to evaluate weather resistance (light fastness).

[Amount of p-Methoxyphenol]

Measurement was conducted according to paragraph [0317] of International Publication No. 2011/040530.

Example 1

Acrylic acid with a carbon stable isotope ratio ($^{13}C$) of −13‰ and a hydrogen isotope ratio of −200‰ (vs. SMOW) was obtained from glucose, which was made from sugar cane, a C4 plant, as a starting raw material, via 3-hydroxypropionic acid by carrying out dehydration and refining.

The obtained acrylic acid was mixed with an aqueous NaOH solution at a neutralization temperature of 60° C. to obtain an aqueous solution of sodium acrylate having a neutralization rate of 75% by mole and a concentration of 35 mass %. In this case, the content of 3-hydroxypropionic acid was 2100 ppm (vs. aqueous sodium acrylate solution).

In the aqueous sodium acrylate solution, 0.05% by mole (vs. sodium acrylate) of polyethylene glycol diacrylate as en internal crosslinking agent was dissolved to obtain a monomer (1). The monomer (1) in an amount of 350 g was loaded to a cylindrical container with a capacity of 1 L within 3 minutes and degassed by bubbling nitrogen at 2 [L/min] for 20 minutes. Next, 0.12 [g/mole] (vs. monomer) of sodium persulfate and 0.005 [g/mole] (vs. monomer) of L-ascorbic acid in form of an aqueous solution were added to the monomer (1) under stirring to start polymerization. After starting the polymerization, stirring was stripped to carry out static aqueous solution polymerization. After 14 minutes from the start of polymerization, a peak polymerization temperature of 110° C. was exhibited. Subsequently, after 30 minutes, a polymer material was taken out of the cylindrical container to obtain a water-containing gel-like crosslinked polymer (1).

The obtained water-containing gel-like crosslinked polymer (1) was finely crushed by a meat chopper (hole diameter 8 mm) under the conditions of an ambient temperature of 45° C. and introduced into a drier within 3 minutes. Drying was carried out by blowing hot air at an air velocity of 1.8 [m/sec] and a temperature of 170° C. for 20 minutes. The dried polymer material (solid content concentration: about 95 mass %) obtained by the drying operation was pulverized by a roll mill and classified with JIS standard sieves into 850 to 150 μm to obtain a particulated water absorbing resin (1).

After a mixture of 0.05 parts by mass of ethylene glycol diglycidyl ether (trade name: Denacol (registered trademark) EX-810: manufactured by Nagase ChemteX Corporation)/1 part by mass of isopropyl alcohol/0.5 parts by mass of propylene glycol (derived from a natural product)/3 parts by mass of water was added as a surface crosslinking agent by spraying relative to 100 parts by mass of the obtained particulated water-absorbing resin (1), the obtained mixture was heated in an oil bath of 200° C. for 40 minutes to obtain a surface-crosslinked water absorbing resin (1).

The L value of the obtained water-absorbing resin (1) in Hunter Lab color system was 89 showing white color. Also, the carbon stable isotope ratio ($\delta^{13}C$) was −13‰. Furthermore, CRC was 32 [g/g], AAP (load: 50 [$g/cm^2$]) was 24

[g/g], and SFC was 20 [×$10^{-7}$·cm$^3$·s·g$^{-1}$]. Also, the propionic acid content was 1300 ppm, water soluble components was 10 mass and residual monomer content was 300 ppm. Further, particles with a particle diameter of 150 μm or larger and smaller than 850 μm were 99 wt. % of entire particles and the mass average particle diameter (D50) was 400 μm. Also, $^{14}$C/C was about 1.2×$10^{-12}$ and it was found that substantially 100% was derived from a nonfossil raw material (percent modern carbon: pMC).

Comparative Example 1

The same operation as in Example 1 was performed, except that acrylic acid synthesized by using propylene gas obtained by cracking crude oil, a fossil resource, as a starting raw material was used.

The content of 3-hydroxypropionic acid in the obtained comparative water absorbing resin (1) was 3780 ppm and the content of residual monomers was 1480 ppm. Also, the carbon stable isotope ratio ($\delta^{13}$C) measured in the above-mentioned Measurement Example 9 was −25‰. It was understood that the polyacrylic acids of Example 1 and Comparative Example 1 had the same polymer structure and almost the same physical properties, but can be distinguished easily from each other based on the carbon stable isotope ratio.

Example 2

A water-absorbing resin (2) with a carbon stable isotope ratio ($\delta^{13}$C) of −19‰ was obtained by carrying out polymerization, drying, pulverization, classification, surface-crosslinking, and the like in the same manner as in Example 1, except that acrylic acid obtained by mixing acrylic acid (nonfossil raw material) derived from a C4 plant used in Example 1 and acrylic acid (fossil raw material) used in Comparative Example 1 at 1:1 was used. The water-absorbing resin (2) showed a more particular carbon stable isotope ratio and thus it was understood that the resin can be easily identified. It was found that 50% of carbon in polyacrylic acid was derived from the nonfossil raw material and 50% from the fossil raw material based on that $^{14}$C/C was about 0.6×$10^{12}$. Additionally, other physical properties were almost the same as those of Example 1.

Example 3

A water-absorbing resin (3) with a carbon stable isotope ratio ($\delta^{13}$C) of −16‰ and $^{14}$C was about 0.9×$10^{12}$ was obtained by carrying out polymerization, drying, pulverization, classification, surface-crosslinking, and the like in the same manner as in Example 1, except that acrylic acid obtained by mixing acrylic acid (nonfossil raw material) derived from a C4 plant used in Example 1 and acrylic add (fossil raw material) used in Comparative Example 1 at 3:1 was used. The water absorbing resin (3) showed a more particular carbon stable isotope ratio and thus it was understood that the resin can be easily identified. It was found that based on that $^{14}$C/C, the ratio of carbon in polyacrylic add derived from the nonfossil raw material and from the fossil raw material was 3:1. Additionally, other physical properties were almost the same as those of Example 1.

Comparative Example 2

When a water-absorbing resin was taken out of a commercial zed disposable diaper (Pampers (registered trademark); manufactured by Procter & Gamble) in USA and analyzed, it was found that the resin was partially neutralized polyacrylic add sodium salt and had a carbon stable isotope ratio of −25‰. It was understood that the water-absorbing resin of the present invention can be easily specified even after production.

Example 4

The water-absorbing resin (1) obtained in Example 1 in an amount of 100 parts by mass was mixed evenly with a surface-crosslinking agent solution (ion binding surface-crosslinking agent) containing 1.17 parts by mass of an aqueous 27.5 mass % aluminum sulfate solution (8 mass % are terms of aluminum oxide), 0.196 parts by mass of an aqueous 60 mass % sodium lactate solution, and 0.029 parts by mass of propylene glycol. Addition of aluminum sulfate improved the liquid permeability (SFC) to 30 and owing to aluminum element and higher liquid permeability, distinction of the water-absorbing resin from other water-absorbing resins was made easier and reliable and the traceability was improved in addition to $^{13}$C.

Example 5

Acrylic acid derived from corn ($\delta^{13}$C was −10‰, $^{14}$C/C was about 1.2×$10^{-12}$) was obtained by obtaining acrolein by vapor-phase dehydration of glycerin, which was obtained by converting corn oil obtained from corn, a C4 plant, into biodiesel; carrying out vapor-phase oxidization of the acrolein to obtain acrylic acid; and subjecting the acrylic acid to distillation and crystallization. The propionic acid content in the acrylic acid was 1000 ppm or less.

As a polymerization inhibitor and a tracer, 70 ppm of p-methoxyphenol was added to the acrylic acid. The obtained acrylic acid was mixed with an aqueous NaOH solution at a neutralization temperature of 60° C. to obtain an aqueous solution of sodium acrylate having a neutralization rate of 75% by mole and a concentration of 38 mass %. Further, after 0.05% by mole of trimethylolpropane triacrylate as a crosslinking agent was added and the aqueous monomer solution was controlled to 20° C., as a polymerization initiator, 0.12 [g/mole] of sodium persulfate and 0.005 [g/mole] of L-ascorbic acid were added to carry out polymerization and subsequently, drying, pulverization and classification were carried out in the same manner as in Example 1. Next, an aqueous surface-crosslinking agent solution containing 0.5 parts by weight of glycerin/0.2 parts by weight of aluminum sulfate hexadeca-hydrate/2 parts by weight of water/0.5 parts by weight of isopropanol as a surface-crosslinking agent was added to 100 parts by weight of the water-absorbing resin and the mixture was further heated at 180° C. for 30 minutes to obtain a surface-crosslinked water-absorbing resin (5).

The L value of the obtained water-absorbing resin (5) in Hunter Lab color system was 89 showing white color. Also, the carbon stable isotope ratio was −10‰. Furthermore, CRC was 27 [g/g], AAP (load: 50 [g/cm$^2$]) was 21 [g/g], p-methoxyphenol was 10 ppm, and SFC was 50 [×$10^{-7}$·cm$^3$·s·g$^{-1}$]. Also, the propionic acid content was 1300 ppm, water soluble components was 10 mass %, and residual monomer content was 300 ppm. Further, particles with a particle diameter of 150 μm or larger and smaller than 850 μm were 99 wt. % of entire particles and the mass average particle diameter (D50) was 380 μm. Also, HOC was about $1.0\times10^{-12}$ and it was found that substantially 100% was derived from a nonfossil raw material.

Comparative Example 3

The same operation as in Example 5 was carried out, except that acrylic add obtained by vapor-phase oxidation of propylene derived from petroleum as a fossil raw material was used in Example 5 to obtain a comparative water-absorbing resin (3) ($\delta^{13}C$ was −27‰ and $^{14}C/C$ was $1.0\times10^{-14}$ or less).

Example 6

The same operation as in Example 5 was carried out, except that the particle size was adjusted to 850 to 53 μm in accordance with U.S. Patent Application Publication No. 2007/0219521 and Example 2 in the publication (20 to 240 mesh: corresponding to 850 to 53 μm) in Example 5. Consequently, SFC of the obtained water-absorbing resin (6) was lowered to 42 [$\times10^{-7}\cdot cm^3\cdot s\cdot g^{-1}$] from 50 [$\times10^{-7}\cdot cm^3\cdot s\cdot g^{-1}$] as SFC of Example 5 by changing the particle size. Also, the carbon stable isotope ratio ($\delta^{13}C$) was −10‰.

Example 7

In Example 5, surface-crosslinking was carried out using only glycerin in accordance with U.S. Patent Application Publication No. 2007/0219521 and Example 2 in the publication (ethylene carbonate alone is used as a surface-crosslinking agent; no aluminum sulfate, a polyvalent metal, was used). SFC of the obtained water-absorbing resin (7) was lowered to 30 [$\times10^{-7}\cdot cm^3\cdot s\cdot g^{-1}$] from 50 [$\times10^{-7}\cdot cm^3\cdot s\cdot g^{-1}$] as SFC of Example 5 by changing, the surface-crosslinking agent and using no polyvalent metal. Also, the carbon stable isotope ratio (SIT) was −10‰.

Example 8

In Example 5, polymerization was carried out in accordance with U.S. Patent Application Publication No. 2007/0219521 and Example 2 in the publication (no p-methoxyphenol was used at the time of polymerization) without using p-methoxyphenol. The physical properties of the obtained water-absorbing resin (8) were almost the same ($\delta^{13}C$ was −10‰) as those of the water absorbing resin (5); however, no p-methoxyphenol was detected and as a result, the light fastness was lowered by about 10% (deemed as the water soluble component increase by ultraviolet ray irradiation to 30 times swollen gel).

Example 9

In Example 5, the surface-crosslinking agent did not contain 0.2 parts by weight of aluminum sulfate hexadecahydrate and 0.3 parts by weight of Aerosil 200 (silica fine particles manufactured by Nippon Aerosil Co. Ltd.) as water-insoluble inorganic fine particles was dry-mixed with 100 parts by weight of the water-absorbing resin after the surface-crosslinking. The obtained water-absorbing resin (9) was the same as the water-absorbing resin (5), except that AAP (load: 50 [g/cm²]) was lowered to 19 [g/g], and SFC was changed to 55 [$\times10^{-7}\cdot cm^3\cdot s\cdot g^{-1}$]. Also, the carbon stable isotope ratio ($\delta^{13}C$) of the water-absorbing resin (9) was −10‰.

Example 10

In Example 5, the surface-crosslinking agent did not contain 0.2 parts by weight of aluminum sulfate hexadecahydrate and 0.3 parts by weight of polyethyleneimine (P-1000, Nippon Shokubai Co Ltd.) in form of an aqueous solution was mixed with 100 parts by weight of the water absorbing resin after the surface-crosslinking. The obtained water-absorbing resin (10) was the same as the water-absorbing resin (5), except that AAP (load: 50 [g/cm²]) was lowered to 20 [g/g] and SFC was changed to 53 [$\times10^{-7}\cdot cm^3\cdot s\cdot g^{-1}$]. Also, the carbon stable isotope ratio ($\delta^{13}C$) of the water-absorbing resin (10) was −10‰.

Example 11

A water-soluble polyacrylic acid (salt) was obtained by using acrylic acid used in Example 5.

That is, 55 g of isopropanol (hereinafter, abbreviated as IPA), 42 g of pure water, and 1.1 g of ammonium persulfate (hereinafter, abbreviated as APS) were loaded to a 300 mL flask equipped with a stirrer, a thermometer, and a reflux condenser and the mixture was heated to 80° C. while being stirred. Independently and simultaneously, 90 g of acrylic acid and 11.0 g of an aqueous 10 wt. % APS solution were dropwise added over 4 hours to the mixture. On completion of the addition, aging was carried out at 80° C. for 1 hour and after the aging, IPA and water were removed by azeotropic distillation from the system. The removal amount was 70 g and the IPA concentration in the flask at that time was 0.5 wt. % or less. After cooling, 125 g of an aqueous 40 wt. % NaOH solution was added for neutralization and further an aqueous 40 wt. % NaOH solution was added to adjust the pH in the system to 10. Thereafter, 45 g of water was added to obtain an aqueous 40 wt. % sodium polyacrylate solution. Sodium polyacrylate ($^{13}C$ was −10‰) was obtained. Its carbon stable isotope ratio was −10‰ and $^{14}C/C$ was about $1.2\times10^{-12}$. This water-soluble sodium polyacrylate can be distinguished from conventional polyacrylic acid (salts) derived from petroleum and polyacrylic acid (salts) derived from C3 plants.

Example 12

To confirm traceability of a water-absorbing resin of the present invention, the following experiment was carried out.

That is, in Example 1 and Comparative Example 1, the steps were performed up to the drying and after thus obtained dried polymers were mixed, the steps following the pulverizing step in Example 1 were carried out. Of the production lines up to the drying step, the one in which the steps the same as those of Example 1 were carried out was defined as a production line A and the other in which the steps the same as those of Comparative Example 1 were carried out was defined as a production line B.

A dark brown foreign matter (formed by discoloration of the water-absorbing resin by long time heating) was observed in the water-absorbing resin obtained through the above-mentioned steps. The dark brown foreign matter was sampled and its $^{13}C$ volume was measured to find that the carbon stable isotope ratio ($\delta^{13}C$) was −25‰. From this result, it was determined that the production line B had a trouble and the drying apparatus in the production line B was exampled to find the water-absorbing resin adhered to the inner wall face of the drying apparatus and was discolored.

Example 13

To confirm traceability of a water-absorbing resin of the present invention, the following virtual experiment was carried out.

That is, a water-absorbing resin was taken out of a disposable diaper (10 samples in total) purchased in USA in 2009 and it was assumed that one sample among 10 samples was the water absorbing resin (4) produced in Example 4.

When the 10 samples were first subjected to elemental analysis for detecting elements existing in the surface of each water-absorbing resin by an electron probe microanalyzer (EPMA), aluminum was detected in 5 samples. When SFC was measured for the 5 samples in which aluminum was detected, SFC of 3 samples was 0 to 10 [$\times 10^{-7} \cdot cm^3 \cdot s \cdot g^{-1}$] and SFC of the remaining 2 samples was 25 to 35 [$\times 10^{-7} \cdot cm^3 \cdot s \cdot g^{-1}$]. When CRC, AAP, Ext, and residual monomer were measured for 2 samples which showed a high SFC value, both showed almost the same value. When $^{13}C$ volume was measured for these 2 samples, one showed $\delta^{13}C$ of –13‰ and the other –25‰ From these results, it was understand that the sample showing $\delta^{13}C$ of –13‰ was the water-absorbing resin (4).

Example 11 shows a method of reducing the number of samples to be measured by first screening based on presence or absence of aluminum and subsequently measuring the carbon stable isotope ratio.

INDUSTRIAL APPLICABILITY

Use of a biomass-derived material does not increase carbon dioxide in the atmosphere even if the biomass-derived material is burned and an environmentally-friendly water-absorbing resin can be obtained. Also, according to the present invention, it can be verified back to the manufacturing process of the water-absorbing resin when dealing with various problems with the water-absorbing resin which can occur from the manufacturing, process of the water-resin, during the use thereof by a consumer, up until the disposal thereof.

The invention claimed is:

1. A method for producing a polyacrylic acid (salt) water-absorbing resin comprising a polymerization step for a water-soluble unsaturated monomer, a drying step for a water-containing crosslinked polymer obtained by the polymerization step to obtain a dried polymer, a pulverization step of the dried polymer, a particle size classification step of the pulverized dried polymer to obtain a classified water-absorbing resin, and a surface-crosslinking step of the classified water-absorbing resin, wherein the polyacrylic acid (salt) water-absorbing resin is a polymer containing acrylic acid and/or its salt as a repeating unit in an amount of 50 to 100 mol %;

the polymerization step is for polymerizing acrylic acid with a carbon stable isotope ratio (VC) of –20‰ or higher as the water-soluble unsaturated monomer, where the acrylic acid contains an acrylic acid raw material tracer of an acrylic acid produced from a C3 plant and an acrylic acid produced from a C4 plant, wherein the amount of the acrylic acid produced from the C4 plant is 50 wt % or more based on the total amount of the acrylic acid raw material produced from the C3 plant and the C4 plant, and the amount of acrylic acid produced from the C3 plant and acrylic acid produced from the C4 plant is 50% to 99% based on the total amount of acrylic acid;

the water-soluble unsaturated monomer contains p-methoxyphenol as a polymerization inhibitor in an amount of more than 0 ppm and 200 ppm or less, wherein a drying temperature in the drying step is 165° C. to 230° C., a drying time at the drying step is 10 minutes or more, and a hot air velocity in the drying step is 0.1 to 5 m/s to remove at least a portion of propionic acid from said water-absorbing resin, said water-absorbing resin to be processed by the surface-crosslinking step contains fine particles which pass through a sieve with mesh size of 150 μm in an amount of 0 to 5 weight % relative to the entire water-absorbing resin and particles which do not pass through a sieve with mesh size of 850 μm in an amount of 0 to 5 weight % relative to the entire water-absorbing resin, the polyacrylic acid (salt) water-absorbing resin contains p-methoxyphenol, as a polymerization inhibitor, in an amount of 1 to 160 ppm, 95 weight % or more of the polyacrylic acid (salt) water-absorbing resin has a particle size in the range of 150 to 850 μm relative to the polyacrylic acid (salt) water-absorbing resin, wherein an amount of propionic acid contained in the polyacrylic acid (salt) water-absorbing resin is 1500 ppm or less, and a carbon stable isotope ratio ($\delta^{13}C$) of the polyacrylic acid (salt) water-absorbing resin is from –20‰ to –5‰.

2. The method for producing a polyacrylic acid (salt) water-absorbing resin according to claim 1, wherein more than 50 weight % of a carbon source of the acrylic acid is obtained from biomass derived from a C4 plant.

3. The method for producing a polyacrylic acid (salt) water-absorbing resin according to claim 1, wherein the water-soluble unsaturated monomer is obtained by mixing acrylic acid having different carbon stable isotope ratios ($\delta^{13}C$).

4. The method for producing a polyacrylic acid (salt) water-absorbing resin according to claim 1, wherein the dried material obtained in the drying step is surface-crosslinked with an organic surface-crosslinking agent after the drying step and coated with a surface treatment agent selected from a polyvalent metal salt, a polyamine polymer, and water-insoluble inorganic particles after the drying step.

5. The method for producing a polyacrylic acid (salt) water-absorbing resin according to claim 1, wherein the water-soluble unsaturated monomer further satisfies one or more of the following:

the p-methoxyphenol is used as a polymerization inhibitor and the content thereof is 1 to 160 ppm;

the content of Fe is 0 to 2 ppm; and the content of mono- or di-hydroxyacetone is 0 to 10 ppm.

6. The method for producing a polyacrylic acid (salt) water-absorbing resin according to claim 1, wherein a fine powder recycle step is employed in addition to the above steps.

7. The method for producing a polyacrylic acid (salt) water-absorbing resin according to claim 1, wherein the polyacrylic acid (salt) water-absorbing resin contains p-methoxyphenol in an amount of 5 to 60 ppm.

8. The method for producing a polyacrylic acid (salt) water-absorbing resin according to claim 1, wherein the acrylic acid is refined by an aldehyde treatment agent or crystallization.

9. The method for producing a polyacrylic acid (salt) water-absorbing resin according to claim 1, wherein the acrylic acid is refined by multistage crystallization.

10. The method for producing a polyacrylic acid (salt) water-absorbing resin according to claim 4, wherein the surface treatment agent is used in an amount of 0.001 to 5 parts by mass relative to 100 parts by mass of said water-absorbing resin.

11. The method for producing a polyacrylic acid (salt) water-absorbing resin according to claim 4, wherein the water-insoluble inorganic particles used as the surface treatment agent is silicon dioxide.

12. The method for producing a polyacrylic acid (salt) water-absorbing resin according to claim 3, wherein the acrylic acid having different carbon stable isotope ratios ($\delta^{13}C$) is obtained by using acrylic acids derived from a fossil raw material and a nonfossil raw material and the use ratio of two kinds of the acrylic acids is in the range of 1:99 to 99:1.

* * * * *